(12) United States Patent
Ratilainen et al.

(10) Patent No.: US 10,735,914 B2
(45) Date of Patent: Aug. 4, 2020

(54) METHODS AND APPARATUS FOR MULTICAST OR BROADCAST TRANSMISSION

(71) Applicant: Telefonaktiebolaget LM Ericsson (publ), Stockholm (SE)

(72) Inventors: Antti Ratilainen, Espoo (FI); Karin Hedén, Sundbyberg (SE); Tuomas Tirronen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 55 days.

(21) Appl. No.: 16/308,022

(22) PCT Filed: Jul. 7, 2017

(86) PCT No.: PCT/SE2017/050763
§ 371 (c)(1),
(2) Date: Dec. 7, 2018

(87) PCT Pub. No.: WO2018/009137
PCT Pub. Date: Jan. 11, 2018

(65) Prior Publication Data
US 2019/0222967 A1 Jul. 18, 2019

Related U.S. Application Data

(60) Provisional application No. 62/359,779, filed on Jul. 8, 2016.

(51) Int. Cl.
*H04W 4/06* (2009.01)
*H04L 5/00* (2006.01)
(Continued)

(52) U.S. Cl.
CPC ............. *H04W 4/06* (2013.01); *H04L 1/0003* (2013.01); *H04L 1/0011* (2013.01); *H04L 1/189* (2013.01);
(Continued)

(58) Field of Classification Search
CPC ........... H04W 4/06; H04W 4/70; H04W 4/80; H04W 24/08; H04W 56/001;
(Continued)

(56) References Cited

U.S. PATENT DOCUMENTS

2019/0261140 A1* 8/2019 Fujishiro ............... H04W 80/02
2019/0394707 A1* 12/2019 Wong ..................... H04W 4/06

FOREIGN PATENT DOCUMENTS

| EP | 2919402 A1 | 9/2015 |
|---|---|---|
| WO | 0072498 A1 | 11/2000 |
| WO | 2016073591 A1 | 5/2016 |

OTHER PUBLICATIONS

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 13)", Technical Specification, 3GPP TS 36.321 V13.1.0, Mar. 1, 2016, pp. 1-85, 3GPP, France.

(Continued)

*Primary Examiner* — Melvin C Marcelo
(74) *Attorney, Agent, or Firm* — Coats & Bennett, PLLC

(57) ABSTRACT

A wireless device (18) is configured for use in a wireless communication system. The wireless device (18) is configured to receive, from a radio network node (12), a multicast or broadcast transmission (14) and downlink control information indicating a number of repetitions with which the multicast or broadcast transmission (14) is transmitted. The wireless device (18) is also configured to operate according (Continued)

to a negative acknowledgement only feedback scheme in which the wireless device (18) is configured to transmit a negative acknowledgement to the radio network node (12) if decoding of the multicast or broadcast transmission (14) fails using the indicated number of repetitions and to refrain from transmitting a positive acknowledgement to the radio network node (12) if decoding of the multicast or broadcast transmission (14) succeeds.

20 Claims, 16 Drawing Sheets

(51) Int. Cl.
| | |
|---|---|
| H04L 1/00 | (2006.01) |
| H04L 1/18 | (2006.01) |
| H04W 4/70 | (2018.01) |
| H04W 4/80 | (2018.01) |
| H04W 24/08 | (2009.01) |
| H04W 56/00 | (2009.01) |

(52) U.S. Cl.
 CPC .......... *H04L 1/1887* (2013.01); *H04L 5/0055* (2013.01); *H04W 4/70* (2018.02); *H04W 4/80* (2018.02); *H04W 24/08* (2013.01); *H04W 56/001* (2013.01)

(58) Field of Classification Search
 CPC ... H04L 1/0003; H04L 1/0011; H04L 1/1887; H04L 1/189; H04L 5/0055
 See application file for complete search history.

(56) References Cited

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 13)", Technical Specification, 3GPP TS 36.331 V13.1.0, Mar. 1, 2016, pp. 1-225, 3GPP, France.

\* cited by examiner

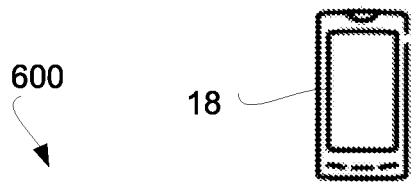

600

18

RECEIVE, FROM A RADIO NETWORK NODE, A MULTICAST OR BROADCAST TRANSMISSION AND DOWNLINK CONTROL INFORMATION INDICATING A NUMBER OF REPETITIONS WITH WHICH THE MULTICAST OR BROADCAST TRANSMISSION IS TRANSMITTED
610

OPERATE ACCORDING TO A NEGATIVE ACKNOWLEDGEMENT ONLY FEEDBACK SCHEME IN WHICH THE WIRELESS DEVICE IS CONFIGURED TO TRANSMIT A NEGATIVE ACKNOWLEDGEMENT TO THE RADIO NETWORK NODE IF DECODING OF THE MULTICAST OR BROADCAST TRANSMISSION FAILS USING THE INDICATED NUMBER OF REPETITIONS AND TO REFRAIN FROM TRANSMITTING A POSITIVE ACKNOWLEDGEMENT TO THE RADIO NETWORK NODE IF DECODING OF THE MULTICAST OR BROADCAST TRANSMISSION SUCCEEDS
620

*FIGURE 14*

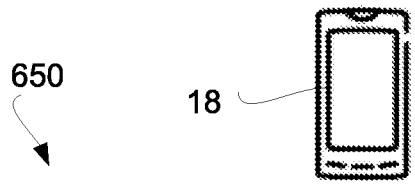

650

RECEIVE, FROM A RADIO NETWORK NODE, A MULTICAST OR BROADCAST TRANSMISSION AND DOWNLINK CONTROL INFORMATION INDICATING A REPETITION FACTOR WITH WHICH THE MULTICAST OR BROADCAST TRANSMISSION IS TRANSMITTED
660

RESPONSIVE TO SUCCESSFULLY DECODING THE MULTICAST OR BROADCAST TRANSMISSION USING ONE OR MORE REPETITIONS WITH WHICH THE MULTICAST OR BROADCAST TRANSMISSION IS TRANSMITTED, REFRAIN FROM PROCESSING ANY ADDITIONAL REPETITIONS WITH WHICH THE MULTICAST OR BROADCAST TRANSMISSION IS TRANSMITTED AND REFRAIN FROM POSITIVELY ACKNOWLEDGING THE SUCCESSFUL DECODING TO THE RADIO NETWORK NODE
670

RESPONSIVE TO FAILING TO DECODE THE MULTICAST OR BROADCAST TRANSMISSION USING A NUMBER OF REPETITIONS ASSOCIATED WITH THE INDICATED REPETITION FACTOR, TRANSMIT FEEDBACK TO THE RADIO NETWORK NODE NEGATIVELY ACKNOWLEDGING RECEPTION OF THE MULTICAST OR BROADCAST TRANSMISSION
680

*FIGURE 15*

METHODS AND APPARATUS FOR MULTICAST OR BROADCAST TRANSMISSION

RELATED APPLICATIONS

This application claims priority to U.S. Provisional Patent Application Ser. No. 62/359,779 filed on Jul. 8, 2016, the entire contents of which are incorporated herein by reference.

BACKGROUND

A multicast or broadcast transmission conveys information to a group of wireless devices efficiently in terms of the radio resources used. Moreover, such a transmission may reduce the amount of time needed to deliver the information to the group of devices, as compared to for example multiple unicast transmissions.

Challenges faced in performing multicast or broadcast transmission include conditioning the transmission for reception by different wireless devices, and re-transmitting the transmission depending on whether different wireless devices successfully received the transmission. This proves particularly consequential when the receiving wireless devices have limited power and/or processing capabilities, such as when the devices are Machine-to-Machine (M2M) devices, Machine Type Communications (MTC) devices, Narrowband Internet of Things (NB-IoT) devices, or the like.

SUMMARY

One or more embodiments herein include a method performed by a wireless device configured for use in a wireless communication system. The method comprises receiving, from a radio network node, a multicast or broadcast transmission and downlink control information indicating a number of repetitions with which the multicast or broadcast transmission is transmitted. The method may also comprise operating according to a negative acknowledgement only feedback scheme in which the wireless device is configured to transmit a negative acknowledgement to the radio network node if decoding of the multicast or broadcast transmission fails using the indicated number of repetitions and to refrain from transmitting a positive acknowledgement to the radio network node if decoding of the multicast or broadcast transmission succeeds.

In some embodiments, according to the negative acknowledgement only feedback scheme the wireless device is configured to transmit a negative acknowledgement on a common uplink feedback channel that is common to wireless devices in a group to which the multicast or broadcast transmission is transmitted. In alternative embodiments, according to the negative acknowledgement only feedback scheme the wireless device is configured to transmit a negative acknowledgement on uplink resources that are separately defined for wireless devices that have uplink synchronization and wireless devices that do not have uplink synchronization.

In some embodiments, the method further comprises, after successfully decoding the multicast or broadcast transmission using one or more repetitions with which the multicast or broadcast transmission is transmitted, refraining from processing any additional repetitions with which the multicast or broadcast transmission is transmitted.

In some embodiments, the multicast or broadcast transmission is transmitted as a multicast or broadcast service. In this case, the method may further comprise receiving explicit control signaling in-band of the multicast or broadcast transmission indicating that scheduling of the multicast or broadcast service is to be stopped; and, responsive to receiving the explicit control signaling, stopping monitoring a control channel for whether the multicast or broadcast service is transmitted. In some of these embodiments, for example, the multicast or broadcast service whose scheduling is indicated as stopped by the explicit control signaling is a single cell point to multipoint, SC-PtM, service.

In any of these embodiments, the wireless device may be a Machine-Type Communication (MTC) device or a Narrowband Internet of Things (NB-IoT) device.

Yet other embodiments herein include a corresponding wireless device, computer program, and carrier.

Embodiments herein also include a method performed by a radio network node for transmitting a multicast or broadcast transmission. The method comprises transmitting a multicast or broadcast transmission to a group of wireless devices. The method also comprises monitoring, until expiration of a defined time period, for feedback indicating negative acknowledgement of the multicast or broadcast transmission. The method may further comprise re-transmitting the multicast or broadcast transmission to the group of wireless devices or declaring the multicast or broadcast transmission successfully received, depending respectively on whether the feedback indicating negative acknowledgement of the multicast or broadcast transmission is or is not received within the defined time period.

In some embodiments, such monitoring may comprise monitoring received power on a common uplink feedback channel that is common to the wireless devices in the group. Alternatively, such monitoring may comprise monitoring for feedback on uplink resources that are separately defined for wireless devices that have uplink synchronization and wireless devices that do not have uplink synchronization.

In some embodiments, the group of wireless devices is a portion of wireless devices served by the radio network node, and includes wireless devices that are substantially co-located.

In some embodiments, the multicast or broadcast transmission is transmitted as a multicast or broadcast service. In this case, the method may further comprises transmitting explicit control signaling in-band of the multicast or broadcast transmission indicating that scheduling of the multicast or broadcast service is to be stopped. In one or more of these embodiments, for example, the multicast or broadcast service whose scheduling is indicated as stopped by the explicit control signaling is a single cell point to multipoint, SC-PtM, service.

In any of these embodiments, the wireless devices may include Machine-Type Communication (MTC) devices and/or Narrowband Internet of Things (NB-IoT) devices.

Still other embodiments herein include a corresponding radio network node, computer program, and carrier.

Still other embodiments herein select a modulation and coding scheme (MCS) and a repetition factor with which to transmit a multicast or broadcast transmission. The selected MCS and the selected repetition factor respectively target reception of the multicast or broadcast transmission under different channel conditions. In some embodiments, for example, the selected MCS targets reception of the transmission under a channel condition that is better than the channel condition under which the selected repetition factor targets reception of the transmission. In these and other embodiments, therefore, wireless devices with channel conditions better than those under which the selected repetition factor targets reception may be able to receive the transmission efficiently using less than all of the transmitted repetitions, and then conserve power by turning off their receiver.

More particularly, embodiments herein include a method performed by a radio network node for transmitting a multicast or broadcast transmission to a group of wireless devices. The method comprises selecting a modulation and coding scheme (MCS) and a repetition factor with which to transmit the multicast or broadcast transmission. The selected MCS and the selected repetition factor respectively target reception of the multicast or broadcast transmission under different channel conditions. The method further comprises transmitting the multicast or broadcast transmission to the group of wireless devices with the selected MCS and repetition factor.

In some embodiments, the selected MCS targets reception of the multicast or broadcast transmission under a channel condition that is better than the channel condition under which the selected repetition factor targets reception of the multicast or broadcast transmission. In these and other embodiments, the method may comprise selecting the repetition factor to target reception of the multicast or broadcast transmission, as transmitted with the selected MCS, under the worst channel condition in the group. Alternatively or additionally, the method may comprise selecting the MCS to target reception of the multicast or broadcast transmission under the best channel condition in the group. Or, the method may comprise selecting the MCS to target reception of the multicast or broadcast transmission under a channel condition that is neither the best nor the worst in the group. As still another option, the method may comprise selecting the MCS to target reception of the multicast or broadcast transmission under an average, median, or percentage threshold channel condition in the group.

In any event, the selection in some embodiments may more particularly comprise selecting the MCS to target reception of the multicast or broadcast transmission under the best channel condition in the group, by selecting a MCS with a MCS order that targets reception only under the best channel condition in the group. The selection may also comprise selecting the repetition factor to target reception of the multicast or broadcast transmission, as transmitted with the selected MCS, under the worst channel condition in the group, by selecting a repetition factor defining a number of repetitions required only under the worst channel condition in the group.

Alternatively or additionally, the selection may comprise selecting the MCS with the highest order among MCSs recommended by channel condition feedback from wireless devices in the group. The selection may further comprise selecting a repetition factor greater than any repetition factor recommended by channel condition feedback from wireless devices in the group, wherein the selected repetition factor targets reception of the multicast or broadcast transmission, as transmitted with the highest order MCS, by a wireless device whose channel condition feedback recommended the greatest repetition factor in the group.

In some embodiments, the selection is dynamically performed based on channel condition feedback from one or more wireless devices in the group.

In some embodiments, the selection comprises jointly selecting the MCS and the repetition factor.

Alternatively or additionally, the method may comprise selecting one or more additional MCS with which to transmit the multicast or broadcast transmission. In this case, the transmitting may comprise transmitting each repetition of the multicast or broadcast transmission with different ones of the selected MCSs.

In some embodiments, the method may further comprise monitoring, until expiration of a defined time period, for feedback indicating negative acknowledgement of the multicast or broadcast transmission, and either re-transmitting the multicast or broadcast transmission to the group of wireless devices responsive to receiving the feedback within the defined time period or declaring the multicast or broadcast transmission successfully received responsive to the feedback not being received within the defined time period. In this case, this re-transmitting may comprise re-transmitting the multicast or broadcast transmission with a MCS having a lower order than the selected MCS and/or with a repetition factor defining a greater number of repetitions than the selected repetition factor. Alternatively or additionally in this case, the monitoring may comprise monitoring received power on a common uplink feedback channel that is common to the wireless devices in the group.

In some embodiments, the method may further comprise receiving feedback on uplink resources that are separately defined for wireless devices that have uplink synchronization and wireless devices that do not have uplink synchronization.

Alternatively or additionally, the group of wireless devices may be a portion of wireless devices served by the radio network node, and may include wireless devices that are substantially co-located.

In still further embodiments, the method may comprise transmitting explicit control signaling in-band of the multicast or broadcast transmission indicating that scheduling of a multicast service is or is to be stopped. In this case, the explicit control signaling may comprise a multicast channel (MCH) Scheduling Information Medium Access Control (MAC) Control Element (CE) or an Extended MCH Scheduling Information MAC CE.

In any event, the transmitting may comprise transmitting the multicast or broadcast transmission as a transport block that is modulated and channel encoded according to the selected MCS and that is repeated a number of times in a time domain or frequency domain according to the selected repetition factor.

In yet further embodiments, the transmitting may comprise transmitting the multicast or broadcast transmission as a Multimedia Broadcast Multicast Service (MBMS) using a Single-Cell Point-to-Multipoint (SC-PtM) transmission scheme.

In any of these embodiments, the wireless devices may include Machine-Type Communication (MTC) devices and/or Narrowband Internet of Things (NB-IoT) devices.

Still other embodiments herein include a corresponding radio network node, computer program, and carrier.

Yet other embodiments herein include a method performed by a wireless device configured for use in a wireless communication system. The method comprises receiving, from a radio network node, a multicast or broadcast transmission and downlink control information indicating a repetition factor with which the multicast or broadcast transmission is transmitted. The method further comprises, responsive to successfully decoding the multicast or broadcast transmission using one or more repetitions with which the multicast or broadcast transmission is transmitted, refraining from processing any additional repetitions with which the multicast or broadcast transmission is transmitted and refraining from positively acknowledging the successful decoding to the radio network node. The method also comprises, responsive to failing to decode the multicast or broadcast transmission using a number of repetitions associated with the indicated repetition factor, transmitting feedback to the radio network node negatively acknowledging reception of the multicast or broadcast transmission.

In some embodiments, this transmitting comprises transmitting the feedback on a common uplink feedback channel that is common to wireless devices in a group to which the multicast or broadcast transmission is transmitted.

Alternatively or additionally, this transmitting comprises transmitting the feedback on uplink resources that are separately defined for wireless devices that have uplink synchronization and wireless devices that do not have uplink synchronization.

In still further embodiments, the method may comprise receiving explicit control signaling in-band of the multicast or broadcast transmission indicating that scheduling of a multicast service is to be stopped. In this case, the method may further comprise, responsive to receiving the explicit control signaling, stopping monitoring a control channel for whether the multicast service is transmitted. In some embodiments, this explicit control signaling comprises a multicast channel (MCH) Scheduling Information Medium Access Control (MAC) Control Element (CE) or an Extended MCH Scheduling Information MAC CE.

Yet other embodiments herein include a corresponding wireless device, computer program, and carrier.

Further embodiments herein include a method performed by a wireless device in a wireless communication system. The method comprises receiving a multicast or broadcast transmission that is transmitted from a radio network node as a Multimedia Broadcast Multicast Service (MBMS) using a Single-Cell Point-to-Multipoint (SC-PtM) transmission scheme. The method also comprises receiving explicit control signaling in-band of the multicast or broadcast transmission indicating that scheduling of the MBMS is to be stopped. The method further comprises, responsive to receiving the explicit control signaling, stopping monitoring a control channel for whether the MBMS is transmitted. In some embodiments, this explicit control signaling comprises a multicast channel (MCH) Scheduling Information Medium Access Control (MAC) Control Element (CE) or an Extended MCH Scheduling Information MAC CE.

Embodiments herein also include a corresponding wireless device, computer program, and carrier.

BRIEF DESCRIPTION OF THE DRAWINGS

FIG. 14 is a logic flow diagram of a method performed by a wireless device according to some embodiments.

FIG. 15 is a logic flow diagram of a method performed by a wireless device according to other embodiments.

DETAILED DESCRIPTION

Figure 1:
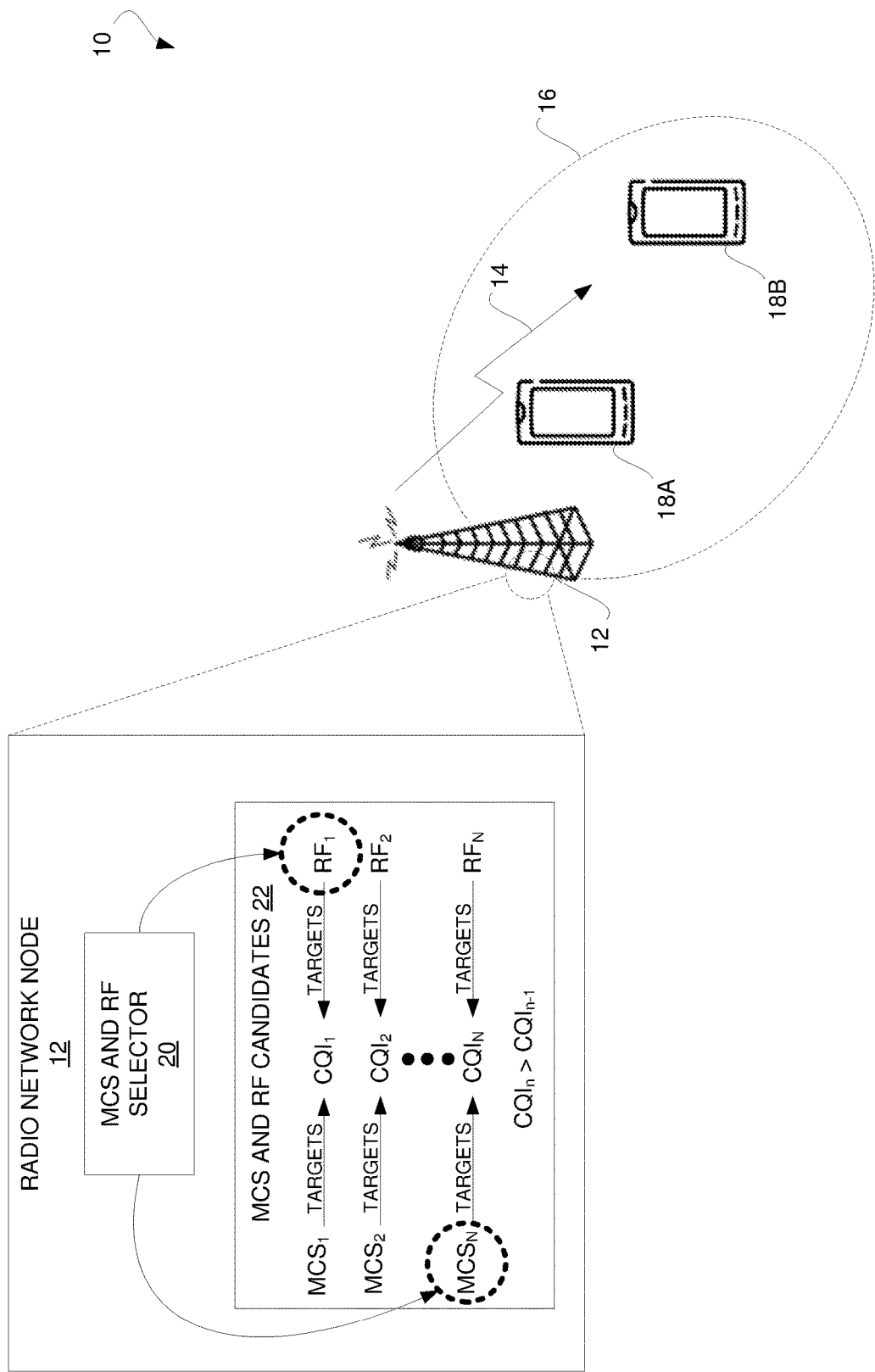
FIG. 1 is a block diagram of a wireless communication system that includes a radio network node according to some embodiments.

FIG. 1 shows a wireless communication system 10 (e.g., a Narrowband Internet of Things, NB-IoT, system) according to one or more embodiments. As illustrated, the system 10 includes a radio network node 12 (shown as a base station) that is configured to transmit a multicast or broadcast transmission 14, e.g., using Multimedia Broadcast Multicast Service (MBMS) Single-Frequency Network (SFN) or Single-Cell Point-to-Multipoint (SC-PtM). The radio network node 12 is configured to transmit the multicast or broadcast transmission 14 to a group 16 of wireless devices, shown as including devices 18A and 18B.

The radio network node 12 is configured to select a modulation and coding scheme (MCS) and a repetition factor (RF) with which to transmit the multicast or broadcast transmission 14. A MCS and RF selector 20 at the radio network node 12 may for example select a MCS from among multiple different candidate MCSs, shown in FIG. 1 as MCS1, MCS2, . . . MCSN. Different candidate MCSs may define different combinations of modulation types (e.g., BPSK, QPSK, 16-QAM, 64-QAM, etc.) and channel coding rates (e.g., ½, ¾, etc.). Different candidate MCSs may therefore target different channel conditions. FIG. 1 shows for instance that different candidate MCS1, MCS2, . . . MCSN target different channel conditions in the form of respective channel quality indicators $CQI_1, CQI_2, \ldots CQI_N$, e.g., in the sense that those channel quality indicators (CQIs) are mapped to the respective MCS candidates. With $CQI_n > CQI_{n-1}$ in FIG. 1, this means that $MCS_n$ targets a better channel condition (e.g., via higher order modulation and/or larger code rate) than the channel condition targeted by $MCS_{n-1}$.

Similarly, the radio network node 12 may select a repetition factor from among multiple different candidate repetition factors, shown in FIG. 1 as $RF_1, RF_2, \ldots RF_N$. Different candidate repetition factors may define different numbers of repetitions with which the multicast or broadcast transmission 14 is to be transmitted. For example, the multicast or broadcast transmission 14 may be transmitted as a particular transport block (TB) repeated a number of times in the time or frequency domain according to a certain repetition factor, e.g., for coherent accumulation at the receiving device. Different repetition factors therefore likewise target different channel conditions. FIG. 1 for instance shows that different candidate repetition factors $RF_1$, $RF_2$, ... $RF_N$ target different channel conditions in the form of respective channel quality indicators $CQI_1$, $CQI_2$, ... $CQI_N$. Smaller repetition factors correspond to fewer numbers of repetitions and thereby target better channel conditions. With $CQI_n>CQI_{n-1}$ in FIG. 1, higher indexed repetition factors in FIG. 1 target better channel conditions with fewer repetitions. That is, $RF_n$ targets a better channel conditions (e.g., via a fewer number of repetitions) than the channel condition targeted by $RF_{n-1}$.

Notably, the MCS and repetition factor selected by the radio network node 12 may respectively target reception of the multicast or broadcast transmission 14 under different channel conditions (e.g., signal-to-noise-plus-interference ratios, SINRs, block error rates, BLERs, or the like). That is, rather than selecting MCS and repetition factor to both target the same channel condition, the radio network node 12 selects MCS and repetition factor to target different channel conditions. As shown in FIG. 1, for example, the selected $MCS_N$ (encompassed in a dotted circle) targets a different channel condition $CQI_N$ than the channel condition $CQI_1$ targeted by the selected repetition factor $RF_1$ (encompassed in a dotted circle).

In fact, in this example, the channel condition $CQI_N$ targeted by the selected $MCS_N$ is better than the channel condition $CQI_1$ targeted by the selected repetition factor $RF_1$. This means that the selected $MCS_N$ may define a higher modulation order and/or coding rate than the $MCS_1$ which targets the same channel condition $CQI_1$ as the selected repetition factor $RF_1$. And this means that the selected repetition factor $RF_1$ may define a greater number of repetitions than the repetition factor $RF_N$ which targets the same channel condition $CQI_N$ as the selected $MCS_N$.

In some embodiments, configuring the transmission 14 with different transmission parameters targeted for different channel conditions in this way advantageously configures the transmission 14 for receipt by different wireless devices 18 with different channel conditions. The selected MCS may favor receipt of the transmission 14 by wireless devices 18 with certain channel conditions, whereas the selected repetition factor may favor receipt of the transmission 14 by other wireless devices 18 with different channel conditions.

For example, the selected MCS may target a channel condition that is better than the channel conditions experienced by some of the wireless devices 18, while the selected repetition factor may target a channel condition that is worse than the channel conditions experienced by others of the wireless devices 18. As shown in FIG. 1, for instance, the selected MCS may target relatively good channel conditions experienced by a wireless device 18A close to the radio network node 12, but the selected repetition factor may target relatively poor channel conditions experienced by a wireless device 18B far from the radio network node 12. In this case, then, the radio network node 12 transmits the transmission 14 with a relatively higher MCS that device 18A can fully harness (given its relatively good channel conditions), but with a relatively larger repetition factor needed by device 18B (given its relatively poor channel conditions). Even though device 18A does not need such a large repetition factor, the device 18A according to some embodiments may receive the transmission 14 using less than all of the repetitions and thereafter enter an inactive mode (e.g., turn of its receiver) to conserve power. And even though device 18B cannot fully harness such a high MCS, the device 18B according to some embodiments may still nonetheless receive the transmission 14 over the number of repetitions transmitted.

In fact, some embodiments herein select MCS and repetition factor with the aim of maximizing efficient reception by wireless devices 18 with the best channel conditions in the group 16, while also ensuring reception by wireless devices 18 with the worst channel conditions in the group 16. In these and other embodiments, for example, the radio network node 12 may select the MCS to target reception of the multicast or broadcast transmission 14 under the best channel condition in the group 16. The radio network node 12 may for instance select whichever of the MCS candidates 22 has an MCS order that targets reception only under the best channel condition in the group 16. Alternatively or additionally, the radio network node 12 may select the repetition factor to target reception of the multicast or broadcast transmission 14 under the worst channel condition in the group 16. The radio network node 12 may for example select a repetition factor defining a number of repetitions required only under the worst channel condition in the group 16.

Figure 2:
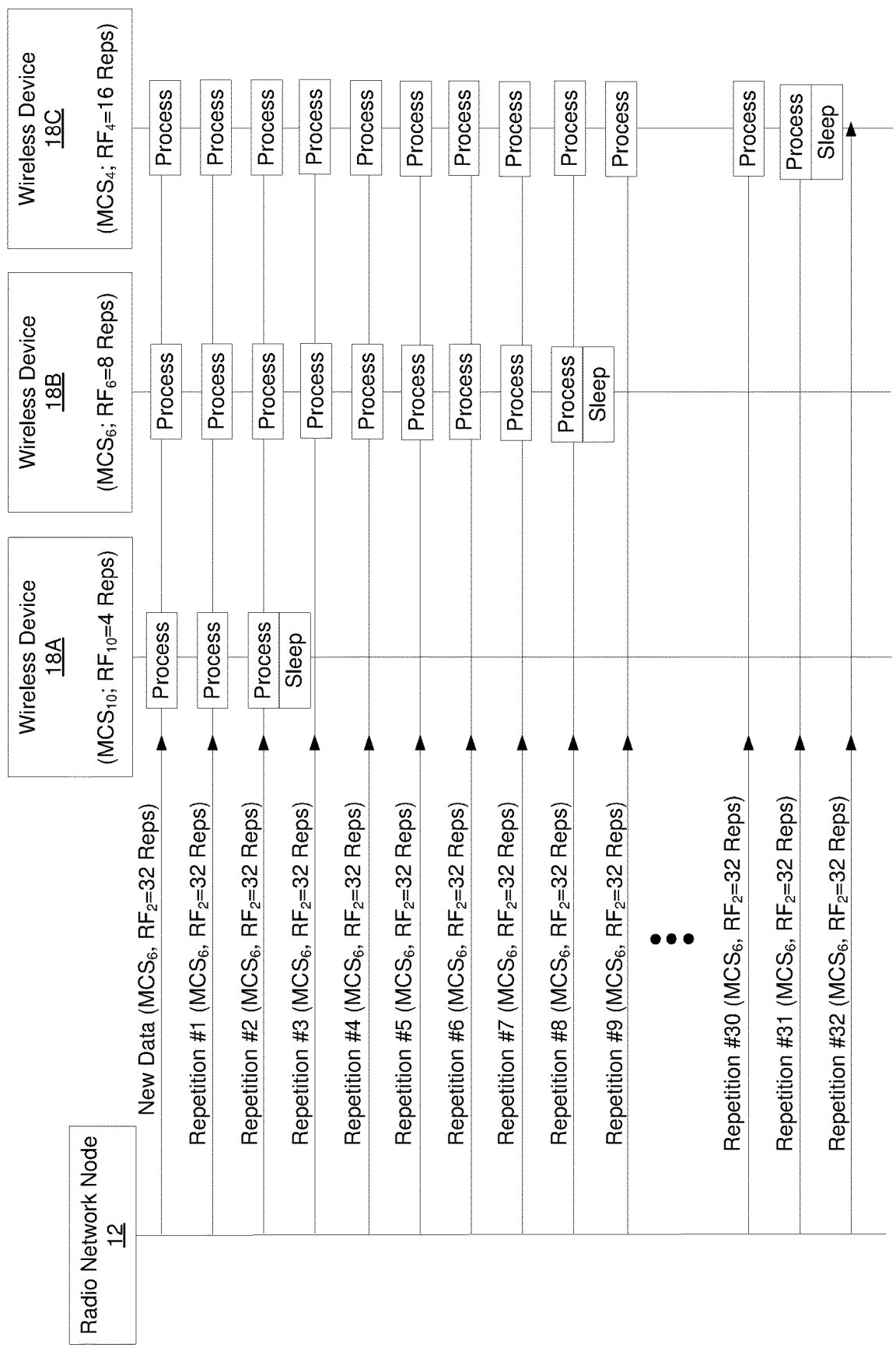
FIG. 2 is a block diagram illustrating an example selection of a modulation and coding scheme (MCS) and repetition factor (RF) for a multicast or broadcast transmission to a group of wireless devices that have different channel conditions according to some embodiments.

In at least some embodiments, the radio network node 12 selects the repetition factor to account for the MCS that is selected. The radio network node 12 may for instance select the repetition factor to target reception of the transmission 14, as transmitted with the selected MCS, under the worst channel condition in the group 16. Where the selected MCS targets reception under the best channel condition in the group 16, for example, the radio network node 12 may select the repetition factor to be greater, in order to compensate for the relatively higher MCS selected. The radio network node 12 may similarly select the repetition factor to compensate for the selected MCS, even if the selected MCS targets reception under a channel condition that is neither the best nor the worst in the group 16. The radio network node 12 may for example select the MCS to target reception of the transmission 14 under an average, median, or percentage threshold (e.g., 80th percentile) channel condition in the group 16. In this case, the radio network node 12 may still select the repetition factor to compensate for the selected MCS targeting reception under better channel conditions than those experienced by some devices in the group 16. FIG. 2 illustrates one example in this regard.

As shown in FIG. 2, the radio network node 12 transmits a multicast or broadcast transmission to three wireless devices 18A, 18B, and 18C in a group. These wireless devices have different channel conditions. Device 18A for example has a relatively good channel condition $CQI_{10}$ that supports $MCS_{10}$ and $RF_{10}$ (where $RF_{10}$ corresponds to 4 repetitions), whereas device 18B has a mediocre channel condition $CQI_6$ that supports $MCS_6$ and $RF_6$ (where $RF_6$ corresponds to 8 repetitions) and device 18C has a relatively poor channel condition $CQI_4$ that only supports $MCS_4$ and $RF_4$ (where $RF_4$ corresponds to 16 repetitions).

The radio network node 12 accordingly adapts or selects the MCS and repetition factor with which to transmit the multicast or broadcast transmission 14, to account for the different channel conditions of the devices 18A, 18B, and 18C in the group. As shown, the base station 16 selects $MCS_6$ to target reception of the transmission 14 under the mediocre channel condition $CQI_6$ experienced by device 18B. This $MCS_6$ is lower than that supported by device 18A, resulting in a slower instantaneous transmission rate than that supported by device 18A. And this $MCS_6$ is higher than that supported by device 18C, making it harder for device 18C to decode the transmission 14. To compensate for the selected $MCS_6$ being higher than that supported by device 18C, the radio network node 12 selects the repetition factor $RF_2$ corresponding to 32 repetitions, instead of the repetition factor $RF_6$ corresponding to 16 repetitions. That is, even though device 18C would have supported repetition factor $RF_4$ corresponding to only 16 repetitions had the transmission 14 been transmitted with the lower order $MSC_4$, the radio network node 12 selects the higher repetition factor $RF_2$ corresponding to 32 repetitions in order to compensate for selection of the higher order $MSC_6$.

FIG. 2 shows the implications of this MSC and RF selection. Wireless device 18A successfully receives (e.g., decodes) the transmission 14 after only 3 of the 32 repetitions, because the transmission 14 is transmitted with a lower order MSC than its channel conditions support. The device 18A therefore refrains from processing more than the three repetitions required for successful reception and as shown goes to sleep to conserve power. The device 18A thereby benefits from the MSC selection as it can receive the transmission 14 in a shorter time and smaller amount of resources, and can save battery life by going to sleep.

Wireless device 18B by contrast successfully receives the transmission 14 after 8 of the 32 repetitions. This is because the transmission 14 was in fact transmitted with the same order MSC as the device's channel conditions support.

The transmission 14 however was transmitted with a higher order MSC than that supported by wireless device 18C's channel conditions. Accordingly, the device 18C still has not yet successfully received the transmission 14 after the 16 repetitions that would have been required had the transmission 14 been transmitted with the supported $MSC_4$. But because the transmission 14 is instead transmitted with 32 repetitions, the device 18C is still able to successfully receive the transmission 14 after 31 of the 32 repetitions. The device 18C refrains from processing more than the 31 repetitions required for successful reception and as shown also goes to sleep to conserve power. In this way, the base station 12 selects a higher order MCS to target reception by device 18A with good channel quality and, to ensure that device 18C with bad channel quality is able to decode the transmission 14, compensates that higher order MCS with a greater number of repetitions.

The radio network node 12 in this and other embodiments may select the MSC and repetition factor for the transmission 14 in any number of ways. The radio network node 12 may for example select the MSC and repetition factor separately without regard to the selection of the other. Alternatively, the radio network node 12 may select the MSC and repetition factor jointly. In this case, the selection of MSC may depend on the selection of the repetition factor and/or the selection of the repetition factor may depend on the selection of the MSC. In this and other embodiments, then, the radio network node 12 may select the MSC and repetition factor in a sequential manner, or may select the MSC and repetition factor simultaneously.

Similarly, the radio network node 12 may perform the selection based on any kind of information. For example, the radio network node 12 may perform the selection so as to select a statically defined MSC and/or repetition factor. The MSC and/or repetition factor in this case may be statically defined based on for example configuration signaling (e.g., system information and/or dedicated radio resource control, RRC, signaling) received from another node in the system 10, based on an assumption about channel conditions in the group 16, and/or based on historical or statistical information on channel conditions in the group 16.

Alternatively or additionally, the radio network node 12 may perform the selection dynamically. The radio network node 12 may for instance perform the selection of one or both of the MSC and repetition factor based on feedback from one or more wireless devices 18 in the group. In some embodiments, this feedback constitutes channel condition feedback, such as channel state information (CSI) feedback, e.g., in the form of CQI feedback which is mapped at the radio network node 12 to certain MSCs and/or repetition factors.

Figure 3:
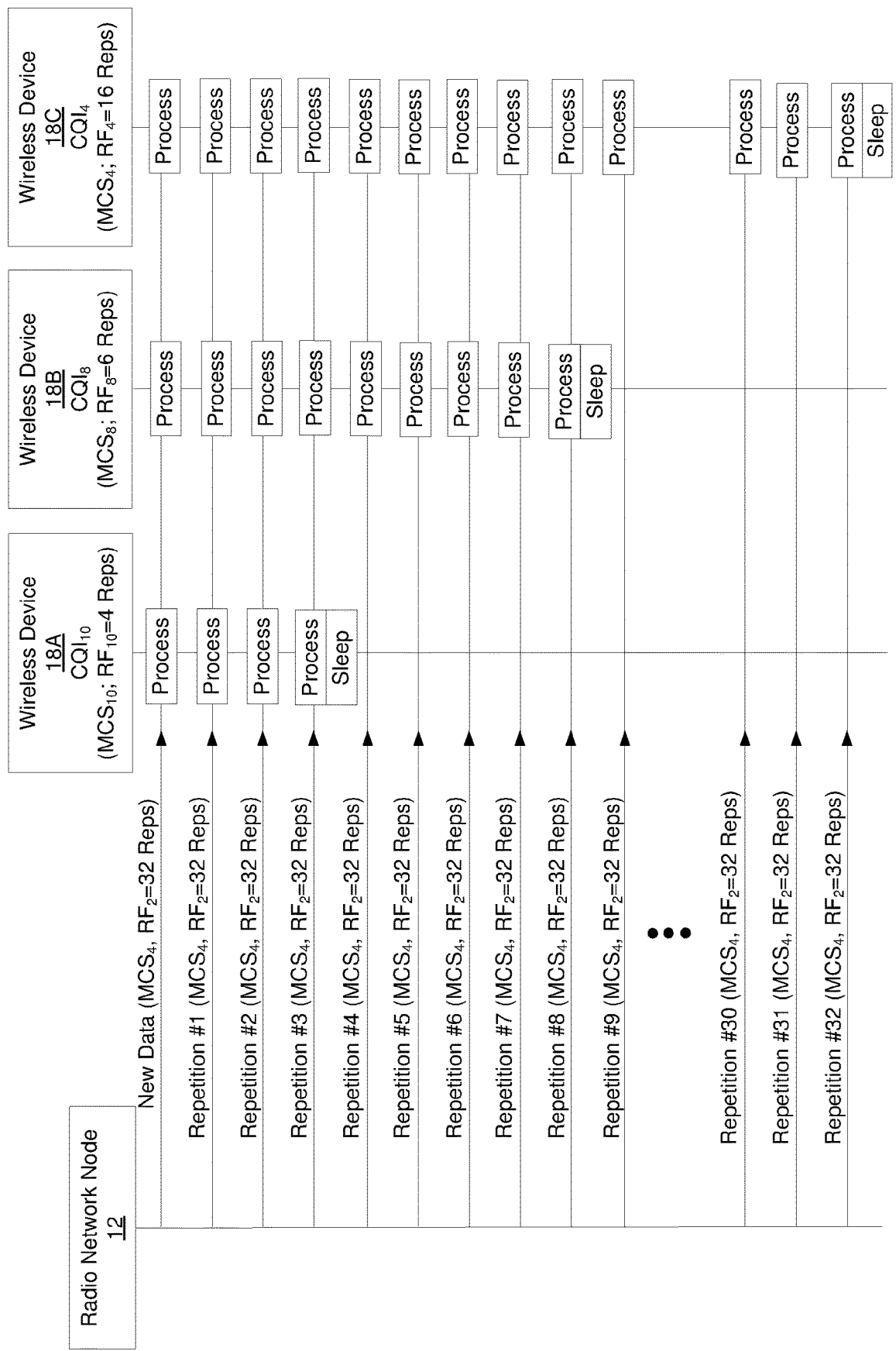
FIG. 3 is a block diagram illustrating an example selection of a modulation and coding scheme (MCS) and repetition factor (RF) for a multicast or broadcast transmission to a group of wireless devices that have different channel conditions according to other embodiments.

In one embodiment, for example, the radio network node 12 selects the MCS with the highest order among MCSs recommended by channel condition feedback from wireless devices 18 in the group 16. In this case, the radio network node 12 may select a repetition factor greater than any repetition factor recommended by channel condition feedback from wireless devices 18 in the group 16. This selected repetition factor may target reception of the multicast or broadcast transmission 14, as transmitted with the highest order MCS, by a wireless device whose channel condition feedback recommended the greatest repetition factor in the group 16. FIG. 3 illustrates one such example.

As shown in FIG. 3, the radio network node 12 receives channel condition feedback $CQI_{10}$ from device 18A. This $CQI_{10}$ maps at the radio network node 12 to $MCS_{10}$ and $RF_{10}$ (corresponding to 4 repetitions). The radio network node 12 receives channel condition feedback $CQI_8$ from device 18B. This $CQI_8$ maps at the radio network node 12 to $MCS_8$ and $RF_8$ (corresponding to 6 repetitions). And the base station receives channel condition feedback $CQI_4$ from device 18C. This $CQI_4$ maps at the radio network node 12 to $MCS_4$ and $RF_4$ (corresponding to 16 repetitions). Based on this feedback, the radio network node 12 selects $MCS_4$ as the MSC with the highest order among MCSs recommended by feedback $CQI_{10}$, $CQI_8$, and $CQI_4$ from devices 18A, 18B, and 18C in the group. The radio network node 12 selects $RF_2$ as being a repetition factor greater than any repetition factor $RF_{10}$, $RF_8$, $RF_4$ recommended by feedback $CQI_{10}$, $CQI_8$, and $CQI_4$ from devices 18A, 18B, and 18C in the group. This selected repetition factor $RF_2$ targets reception of the transmission 14, as transmitted with the highest order $MCS_4$, by wireless device 18C whose channel condition feedback $CQI_4$ recommended the greatest repetition factor $RF_4$ in the group 16.

Alternatively or additionally, the feedback based on which the radio network node 12 selects the MCS and/or the repetition factor may constitute negative acknowledgement (NACK) feedback. The radio network node 12 may for instance re-transmit the transmission 14 with a MCS having a lower order and/or a repetition factor defining a greater number of repetitions, responsive to receiving negative acknowledgement feedback for a prior transmission. That is, the radio network node 12 may adjust the MSC and repetition level selection to target the transmission 14 for reception under poorer channel conditions than before, after receiving feedback indicating that the prior transmission 14 was not successfully received.

In fact, in some embodiments, the feedback may be performed according to a NACK-only feedback scheme, e.g., on a hybrid automatic repeat request (HARQ) level. According to this scheme, the devices 18 in the group 16 only transmit negative acknowledgement to indicate failed reception; the devices 18 refrain from transmitting positive acknowledgements (ACKs) to indicate successful reception. This scheme may lead to reduced signaling in the uplink and therefore realize power conservation.

Figure 4:
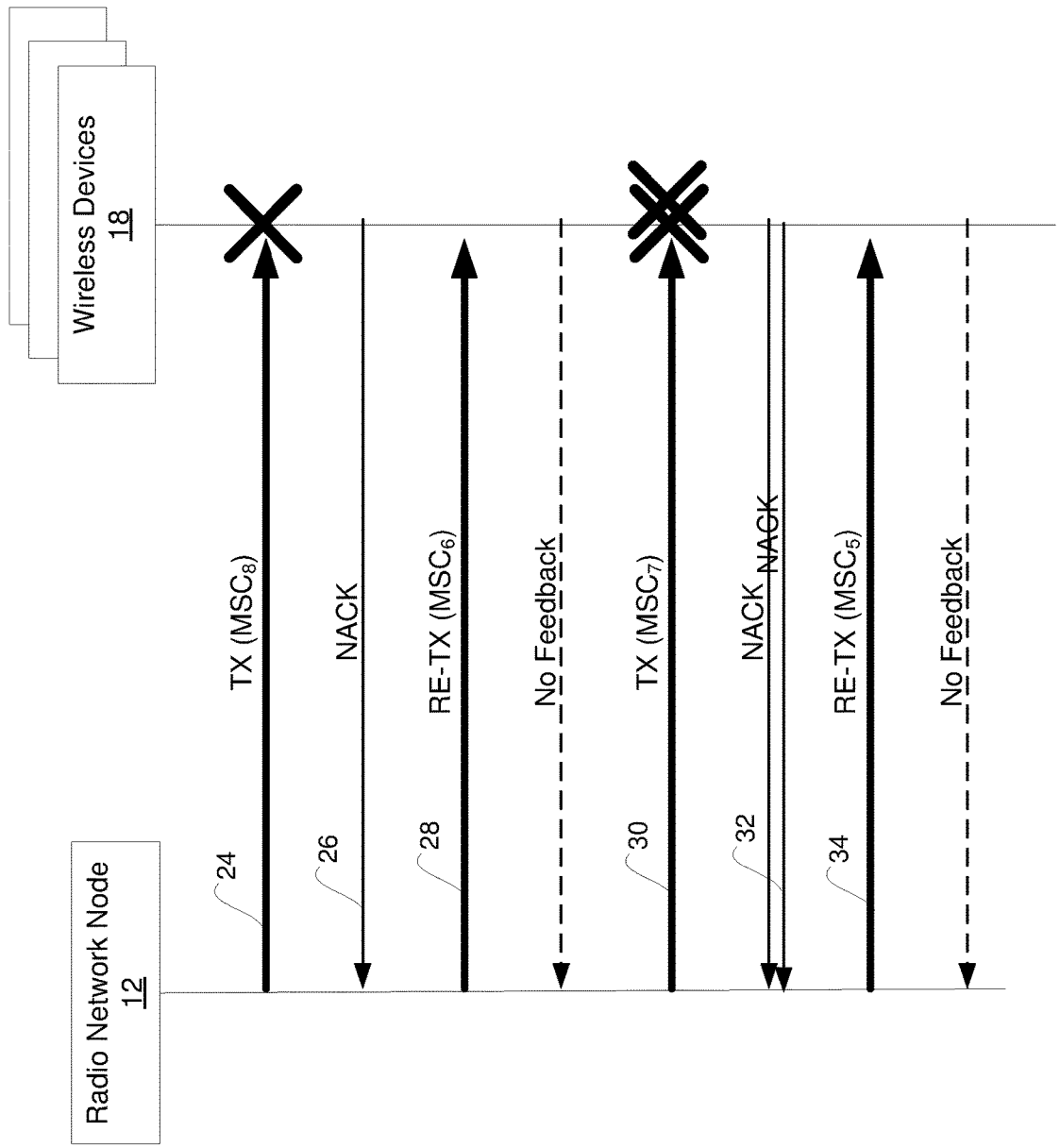
FIG. 4 is a call flow diagram between a radio network node and wireless devices(s) for a negative acknowledgement only feedback scheme according to some embodiments.

FIG. 4 illustrates one example in this regard. As shown, the radio network node 12 initiates a multicast or broadcast transmission 24 to a group of devices 18 subscribing to the multicast or broadcast service. This transmission is performed with a certain $MCS_8$ and is repeated a certain number of times, e.g., as per a configuration. One or more of the devices 18 fail to receive the transmission 24, even after all repetitions are transmitted. Other devices 18 in the group may succeed in receiving the transmission 24. The device(s) 18 that fail to receive the transmission 24 transmit a negative acknowledgement 26 on a configured uplink feedback channel (e.g., LTE PUCCH) to the radio network node 12. The device(s) 18 may for instance receive downlink control information (DCI) indicating the number of repetitions with which the transmission 24 is transmitted, and transmit the negative acknowledgement 26 after failing to decode the transmission 24 using the indicated number of repetitions.

The radio network node 12 meanwhile monitors the configured uplink feedback channel, e.g., until expiration of a defined time period. Where the uplink feedback channel constitutes a common channel that is commonly used by multiple devices 18, this monitoring may happen for instance via energy measurement of the received power in the channel. When the transmitted NACK 26 reaches the radio network node 12, the energy on the channel is increased and the radio network node 12 notices the NACK. The radio network node 12 therefore deduces that not every device 18 received the transmission 24 correctly. The radio network node 12 correspondingly reduces the MCS to make it easier to receive the transmission, e.g., from $MCS_8$ to $MCS_6$. The radio network node 12 performs the re-transmission 28 of the earlier multicast or broadcast transmission 24 on the next scheduled resource.

The device(s) 18 that were unable to receive the original transmission 24 correctly monitor for the re-transmission 28. Responsive to correctly decoding the re-transmission 28 this time, the device(s) 18 refrain from both negative and positive acknowledgement on the uplink feedback channel. The radio network node 12 meanwhile again monitors the configured uplink feedback channel, e.g., until expiration of the defined time period. When the radio network node 12 recognizes that no negative acknowledgement is received, the radio network node 12 declares the re-transmission 28 successfully received. That is, the radio network node 12 assumes that each device 18 in the group received the transmission 24 successfully, either via the original transmission or a subsequent re-transmission thereof.

In some embodiments, the radio network node 12 adjusts the MCS and/or repetition factor of a subsequent multicast or broadcast transmission based on whether a prior transmission was successfully received. In FIG. 4, for instance, the radio network node 12 increases the MCS with which it transmits a subsequent transmission 30, e.g., from $MCS_6$ to $MCS_7$, based on successful reception of the re-transmission 28. However, as shown, multiple devices 18 fail to receive the subsequent transmission 30 correctly after processing all repetitions. The radio network node 12 accordingly identifies NACKs 32 on the common uplink feedback channel. Indeed, even though the feedback channel is common for the devices 18 and the NACKs 32 may collide, the base station 18 concludes that at least one NACK 32 is received since the received power of the channel is higher than when there is no activity.

Based on detecting at least one NACK 32, the radio network node 12 lowers the MCS, e.g., from $MCS_7$ to $MCS_5$. The radio network node 12 then performs retransmission 34 with the lowered $MCS_5$. The radio network node 12 meanwhile again monitors the configured uplink feedback channel, e.g., until expiration of the defined time period. When the radio network node 12 recognizes that no negative acknowledgement is received, the radio network node 12 declares the re-transmission 34 successfully received.

In some embodiments, the uplink feedback channel on which the radio network node 12 receives feedback (e.g., channel condition feedback and/or NACK feedback) may be the only uplink feedback channel defined for all devices 18 to which the transmission 14 is sent. In other embodiments, though, the radio network node 12 receives feedback from different devices over different feedback channels. The different feedback channels may be dedicated to different individual devices, or may be defined for different subgroups of (e.g., substantially co-located) devices 18.

Consider one embodiment where different feedback channels are defined for different subgroups of devices 18. In this case, one representative device 18 from each subgroup is the device that sends feedback over a feedback channel defined for that subgroup. That is, the representative device 18 sends feedback that represents feedback for each device 18 in the subgroup. The radio network node 12 in this case may transmit different versions of the multicast or broadcast transmission 14 to different subgroups, where different versions are transmitted with a MCS and repetition factor selected based on feedback from the representative device 18. Different subgroups may therefore be configured with or allocated different common multicast identifiers, e.g., group radio network temporary identifiers (G-RNTIs). With different feedback channels defined respectively for different subgroups, the radio network node 12 may identify which subgroup sent a given NACK based on which feedback channel the NACK was received on. The radio network node 12 may then selectively re-transmit the transmission to only those group(s) which have sent a NACK.

Additionally or alternatively, the radio network node 12 may receive feedback on uplink resources that are separately defined for wireless devices 18 that have uplink synchronization and wireless devices 18 that do not have uplink synchronization. Uplink synchronization in this regard refers to synchronization of the timing with which different devices' uplink signals arrive at the radio network node 12. In some embodiments, for example, separate uplink feedback resources are defined for devices 18 in RRC_IDLE mode and RRC_CONNECTED mode, where a device 18 has uplink synchronization in RRC_CONNECTED mode but not in RRC_IDLE mode. Devices 18 transmitting without uplink synchronization have a higher chance of interfering with other devices 18, as they are not aware of exactly when the radio network node 12 is expecting to transmit, i.e., their transmissions may overlap in time with others, causing interference and potentially reception failures. In accordance with embodiments herein, then, defining separate uplink feedback resources in this way may mitigate this problem by minimizing the risk of interference between uplink synchronized devices and non-uplink synchronized devices.

In these and other embodiments, once the multicast or broadcast transmission 14 is complete, the radio network node 12 may transmit explicit control signaling to devices 18 indicating that scheduling of the multicast or broadcast service is or is to be stopped. The signaling may for instance include the time (e.g., subframe) at which the scheduling is or will be stopped, if not immediately. Regardless, by explicitly informing devices 18 that the scheduling is stopped, the devices 18 know they do not need to monitor for the transmission 14 anymore (e.g., by attempting to decode an associated control channel with a G-RNTI or other multicast RNTI). The devices 18 can therefore refrain from such monitoring, in order to conserve power. This is especially worthwhile for devices 18 which would otherwise need to monitor the associated control channel (e.g., Long Term Evolution Physical Downlink Control Channel, LTE PDCCH) for long periods of time for a possible downlink control information (DCI) transmission. A device 18 may need to monitor the control channel for a long period of time for instance if the device 18 requires a higher coverage enhancement level associated with a greater number of repetitions. Similar gains may be realized for devices 18 in good coverage, when many repetitions are needed to be sent in order for all devices 18 (including those in poor coverage) to successfully receive the transmission.

Notably, in some embodiments, the radio network node 12 transmits this explicit control signaling in-band of the multicast or broadcast transmission 14 itself. With the signaling being in-band of the transmission 14 itself, the signaling is included in the transmission 14 rather than being separate from that transmission 14. The in-band nature of this explicit control signaling may be realized in any number of ways. In one embodiment, for example, the explicit control signaling comprises a multicast channel (MCH) Scheduling Information Medium Access Control (MAC) Control Element (CE) or an Extended MCH Scheduling Information MAC CE. In still other embodiments, a new MAC CE is defined for this purpose.

Figure 5:
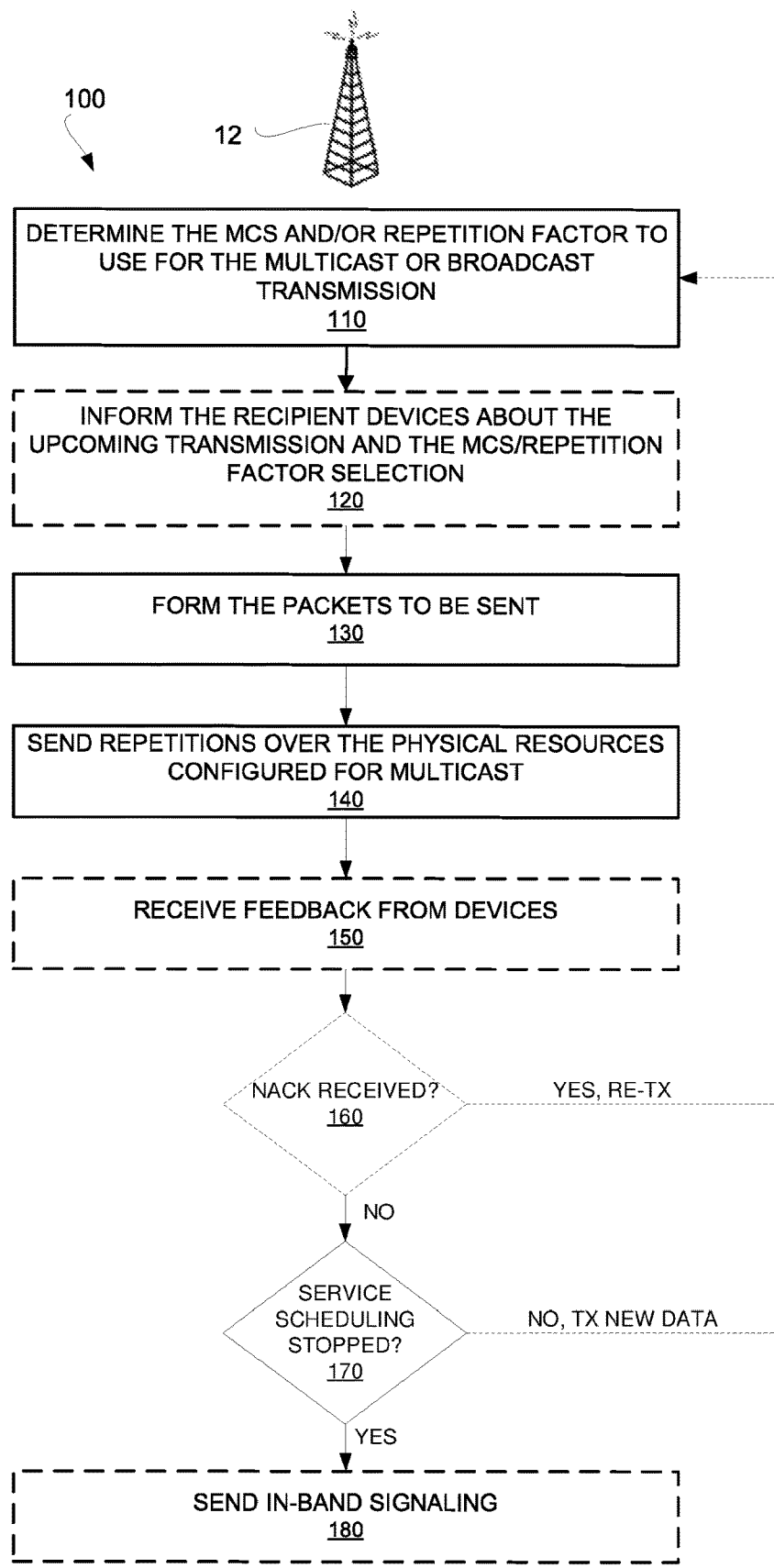
FIG. 5 is a logic flow diagram of a method performed by a radio network node according to some embodiments.

In view of the above, FIG. 5 illustrates a detailed example of processing performed by a radio network node 12 according to some embodiments herein. As shown, the radio network node 12 is configured to determine the MCS and/or repetition factor to use for a multicast or broadcast transmission 14 (Block 110). The MCS selection may be performed according to the requirements of the device with the worst channel conditions, according to a compromise between all of the listening devices 18, based on whether a previous transmission was successfully received or not, or based on a static selection (e.g., particularly if no channel condition feedback is available). A compromise MCS selection may for instance be formed by selecting the MCS based on a threshold, so that a certain fraction of devices use MCS below (or above) a defined limit. For example, if 80% of devices 18 would have MCS 8 or lower, then the radio network node 12 may select that MCS 8. In other embodiments, a compromise MCS selection may constitute a mean or median of the MCSs supported by the devices 18. The repetition factor selection may be performed according to the requirements of the device 18 with the worst channel conditions, according to greater requirements than those of the device 18 with the worst channel conditions (to compensate for higher order MCS selection), or based on a static selection (e.g., particularly if no channel condition feedback is available).

In any event, the radio network node 12 according to some embodiments informs the recipient devices 18 about the upcoming transmission 14 and the MCS and repetition factor selection (Block 120). This way, the devices 18 may for instance know when reception of the transmission 14 has failed due to failure of decoding after the transmitted number of repetitions. Regardless, the radio network node 12 may inform the devices 18 of this information via some defined downlink control signaling, e.g., Downlink Control Information (DCI) over a physical downlink control channel. In some embodiments, though, the MCS and/or number of repetitions may be preconfigured (e.g., signaled in some other way before the transmission 14). In this case, it may not be necessary to signal this information.

The radio network node 12 according to some embodiments then forms the packets (protocol data units, PDUs) to be sent (Block 130) and sends the repetitions over the physical resources configured for multicast or broadcast (Block 140). The radio network node 12 may for instance send the repetitions based on a SC-PtM configuration.

In one or more embodiments, the radio network node 12 may thereafter receive feedback from devices 18 over the physical resources configured for uplink feedback signaling (Block 150). In this case, if a NACK is received (YES at Block 160), the base station may perform readjustment of the MCS and repetition factor selection (e.g., by lowering the MCS and/or increasing the number of repetitions) in order to make it easier for reception. The radio network node 12 may then perform the retransmission with repetitions over the physical resources reserved or configured for multicast or broadcast.

In any event, the radio network node 12 may determine if scheduling of the multicast or broadcast service is to be stopped (Block 170). If not, the radio network node 12 may continue with a subsequent transmission of new data for the service. If the service scheduling is to be stopped, though (YES at Block 170), the radio network node 12 according to some embodiments sends in-band signaling indicating the service scheduling is or is to be stopped (Block 180).

Figure 6:
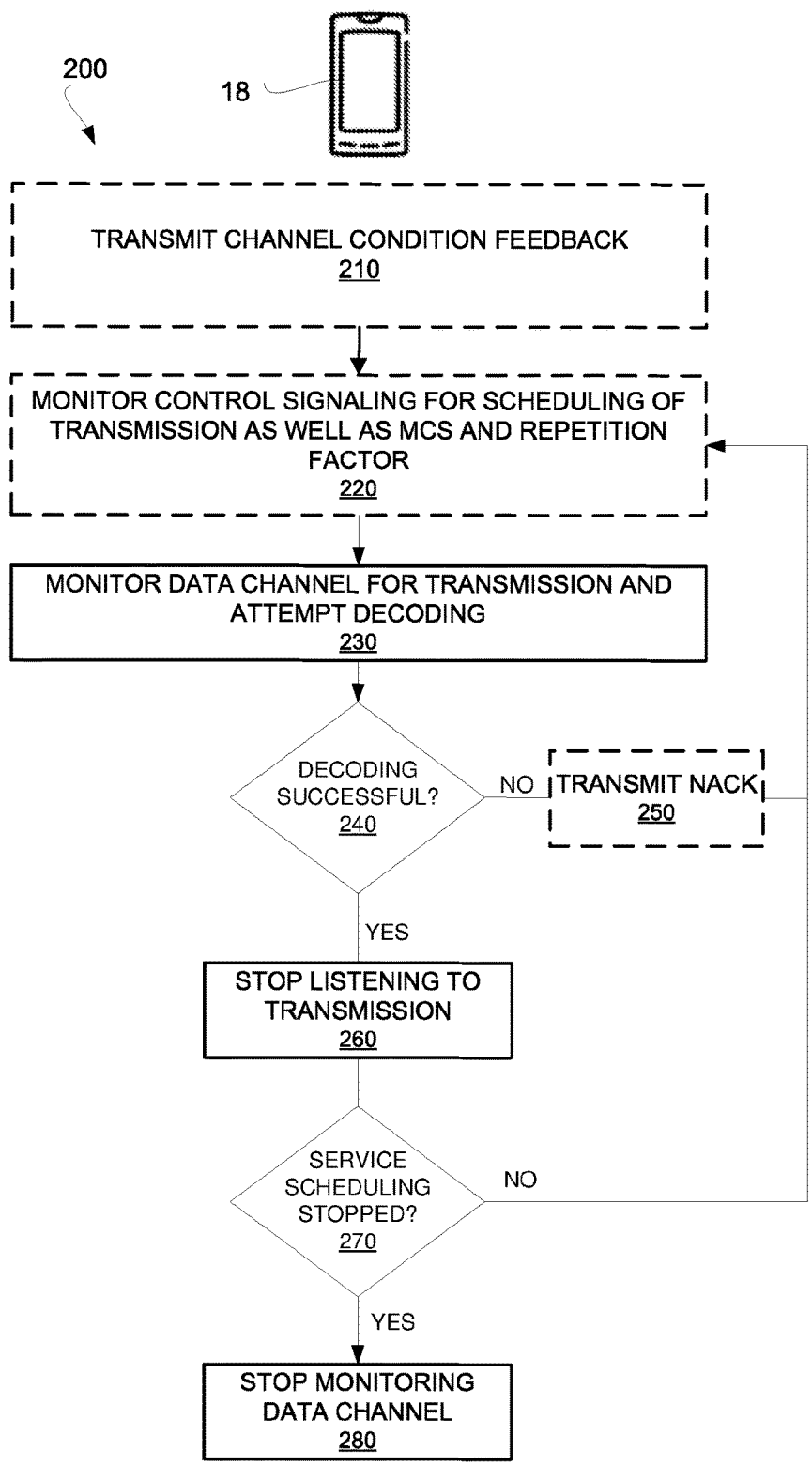
FIG. 6 is a logic flow diagram of a method performed by a wireless device according to some embodiments.

FIG. 6 illustrates corresponding processing performed by a wireless device 18 according to some embodiments. As shown, the wireless device transmits channel condition feedback to the radio network node 12 (Block 210). The device 18 may for instance inform the radio network node 12 about channel quality by transmitting CQI towards the base station, based on which the radio network node 12 may perform its selection of MCS and repetition factor. The device 18 may transmit this feedback upon subscribing to the multicast or broadcast service, or any time thereafter on a dynamic basis.

The wireless device 18 may also monitor control signaling for scheduling of the transmission 14 as well as the MCS and repetition factor used for the transmission 14. The device 18 may for instance listen to DCI scrambled with a G-RNTI or other RNTI sent by the radio network node 12 to learn the MCS and number of repetitions of the upcoming transmission 14. In some embodiments, the MCS and number of repetitions may be preconfigured (i.e., signaling in some other way before the transmission). In these cases, it may not be necessary to obtain the DCI for this information.

The device 18 then monitors a data channel for the transmission 14 and attempts decoding the transmission 14 (Block 230). The device 18 may for instance start listening to the physical resources configured for the multicast or broadcast service (i.e., the multicast data) and trying to decode the transmission upon reception of each repetition.

If decoding of the transmission 14 is not performed successfully (NO at Block 240), e.g., using all or fewer than all of the repetitions, the device 18 may transmit a negative acknowledgement to the base station (Block 250). The device 18 may do so over the physical resources reserved or configured for uplink feedback signaling for the devices 18 in this group (and RRC mode) upon the following scheduled transmission slot. The device 18 may then listen for a re-transmission. Otherwise, if decoding is performed successfully (YES at Block 240), the device 18 may stop listening to the transmission (Block 260) in order to conserve power. The device 18 may for instance sleep through any remaining repetitions that the device 18 did not need for successful decoding. The device 18 may then resume monitoring the data channel for a subsequent transmission of new data.

That said, the device 18 may also monitor in-band signaling for whether the scheduling of the service is stopped after a certain subframe or time instant (Block 270). If the in-band signaling is received, the device 18 may stop monitoring the data channel for the multicast or broadcast data after this threshold (Block 280).

Note that embodiments herein are applicable to any type of wireless communication system capable of multicast or broadcast transmission. Nonetheless, some embodiments are particularly applicable or suitable for narrowband internet of things (NB-IoT), enhanced MTC (eMTC), or other successors to the Enhanced Universal Terrestrial Radio Access Network (E-UTRAN).

Indeed, there has been a lot of work in 3GPP lately on specifying technologies to cover Machine-to-Machine (M2M) and/or Internet of Things IoT) related use cases. Most recent work for 3GPP Release 13 includes enhancements to support Machine-Type Communications (MTC) with a new UE category M1 (Cat-M1), supporting reduced bandwidth of up to 6 physical resource blocks (PRBs), and Narrowband IoT (NB-IoT) work item specifying a new radio interface (and UE category NB1, Cat-NB1).

LTE enhancements introduced in 3GPP Release 13 for MTC will be referred to as "eMTC", including (not limiting) support for bandwidth limited UEs, Cat-M1, and support for coverage enhancements. This is to separate discussion from NB-IoT, although the supported features are similar on a general level.

There are multiple differences between "legacy" LTE and the procedures and channels defined for eMTC work (likewise for NB-IoT). Some important differences include a new physical downlink control channel, called MTC PDCCH (MPDCCH) used in eMTC and narrowband PDCCH (NPDCCH) used in NB-IoT.

In the LTE specifications multicast and broadcast services have been specified under Multimedia Broadcast Multicast Services (MBMS) enabling transmission of the same content to multiple user equipments UEs (in a specified area) at the same time.

Neither Cat-M1 or NB-IoT UEs support MBMS to date. However, for many IoT use cases, multicast support would be an important feature to have. Example use cases could include transmission of a firmware update to a large number of sensors (or other devices) or sending a command to a large number of actuators at the same time. Currently such transmissions/commands would need to be transmitted to each receiving UE separately using unicast, but using multicast to transmit the same transmission/command to a large number of UEs with a single transmission would reduce the time needed to deliver the message and the radio resources required thus increasing spectral efficiency.

The multicast services can be realized using two different transmissions schemes, MBMS Single-Frequency Network (MBSFN) and Single-Cell Point-to-Multipoint (SC-PTM).

In SC-PTM, part of the configuration and control information is sent over Single-Cell Multicast Control Channel (SC-MCCH) logical channel [TS 36.321]. UEs are not expected to monitor this channel continuously, but an indication of change to this information is indicated using SC-N-RNTI, which UEs are expected to monitor [TS 36.331].

Likewise for MBSFN, part of the configuration and control information is sent over Multicast Control Channel (MCCH). Changes are indicated using M-RNTI in this case.

The current multicast features MBSFN/SC-PtM are not compatible with eMTC/NB-IoT, meaning that multicast support does not exist for eMTC or NB-IoT.

Challenges with multicasting in MTC concern coverage requirements, among others. The challenge is to serve the UEs close and further away from the eNB alike with the same service. The UEs close to the eNB usually have good link quality to the eNB while the UEs further away from the eNB tend to have worse link quality, and the eNB is required to be able to provide service to all UEs within its coverage. This means adjusting MCS and using other methods to be able to provide sufficient service even for those UEs at the edge of the eNB's coverage area. One approach would be to adjust MCS to lower levels and more time and resources would need to be spent for the transmission to make sure the UEs are able to receive the transmission correctly despite the bad signal quality. On the other hand, the UEs close to the eNB with good link quality would benefit from higher order MCS to make the transmission faster and more efficient, since they can decode the transmission more easily. Using low order MCS for good link quality UEs causes unnecessary amount of radio resources and time spent, as well as increased battery consumption for those UEs since they need to be active longer.

Another problem with multicast and MTC is the feedback, as currently MBSFN and SC-PtM do not support feedback. Without feedback, the enhanced Node B (eNB) can't be sure whether all UEs received the transmission correctly. Some MTC use cases may require that the multicast transmission is received correctly by every receiving UE.

One or more embodiments adapt MBMS SC-PtM to make it compatible and suitable for eMTC and NB-IoT. To provide sufficient multicast service for all UEs within the service coverage, the transmitted transport blocks (TBs) are repeated in bundles where the MCS has been carefully selected. Additionally and optionally, a NACK based UE feedback mechanism on HARQ level is proposed to inform the eNB about failed reception and to trigger retransmissions and adjustment of MCS.

In at least some embodiments, this solution allows the usage of multicast services in MTC devices, specifically in UEs based on the eMTC and NB-IoT work (i.e. UEs based on categories M1 and NB1, and possible future categories specified beyond these). This results in savings in battery consumption, resource usage and time, when the intention is to transmit the same data to multiple UEs.

Note that in an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring and/or reporting of the vehicle's operational status or other functions associated with the vehicle.

In general, though, a radio node herein is any type of node (e.g., a base station or wireless device) capable of communicating with another node over radio signals. A radio network node (e.g., a base station) is any type of radio node within a wireless communication network, such as a base station. A wireless communication device or simply "wireless device" is any type of radio node capable of communicating with a radio network node over radio signals. A wireless communication device may therefore refer to a machine-to-machine (M2M) device, a machine-type communications (MTC) device, a NB-IoT device, etc. The wireless device may also be a user equipment (UE), however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

Figure 7:
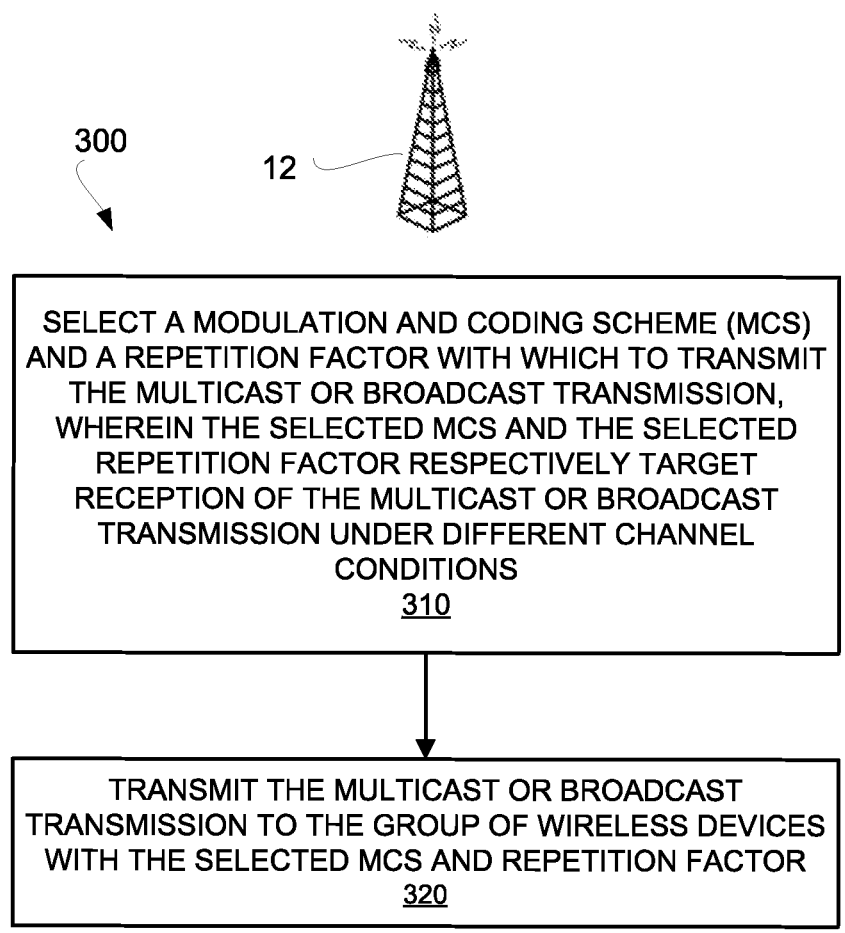
FIG. 7 is a logic flow diagram of a method performed by a radio network node according to other embodiments.

In view of the above modifications and variations, FIG. 7 illustrates a method 300 performed by a radio network node 12 for transmitting a multicast or broadcast transmission 14 to a group 16 of wireless devices 18, according to some embodiments. As shown in FIG. 7, the method 300 comprises selecting a modulation and coding scheme (MCS) and a repetition factor with which to transmit the multicast or broadcast transmission 14 (Block 310). The selected MCS and the selected repetition factor respectively target reception of the multicast or broadcast transmission 14 under different channel conditions. The method 300 also comprises transmitting the multicast or broadcast transmission 14 to the group 16 of wireless devices 18 with the selected MCS and repetition factor (Block 320).

Figure 8:
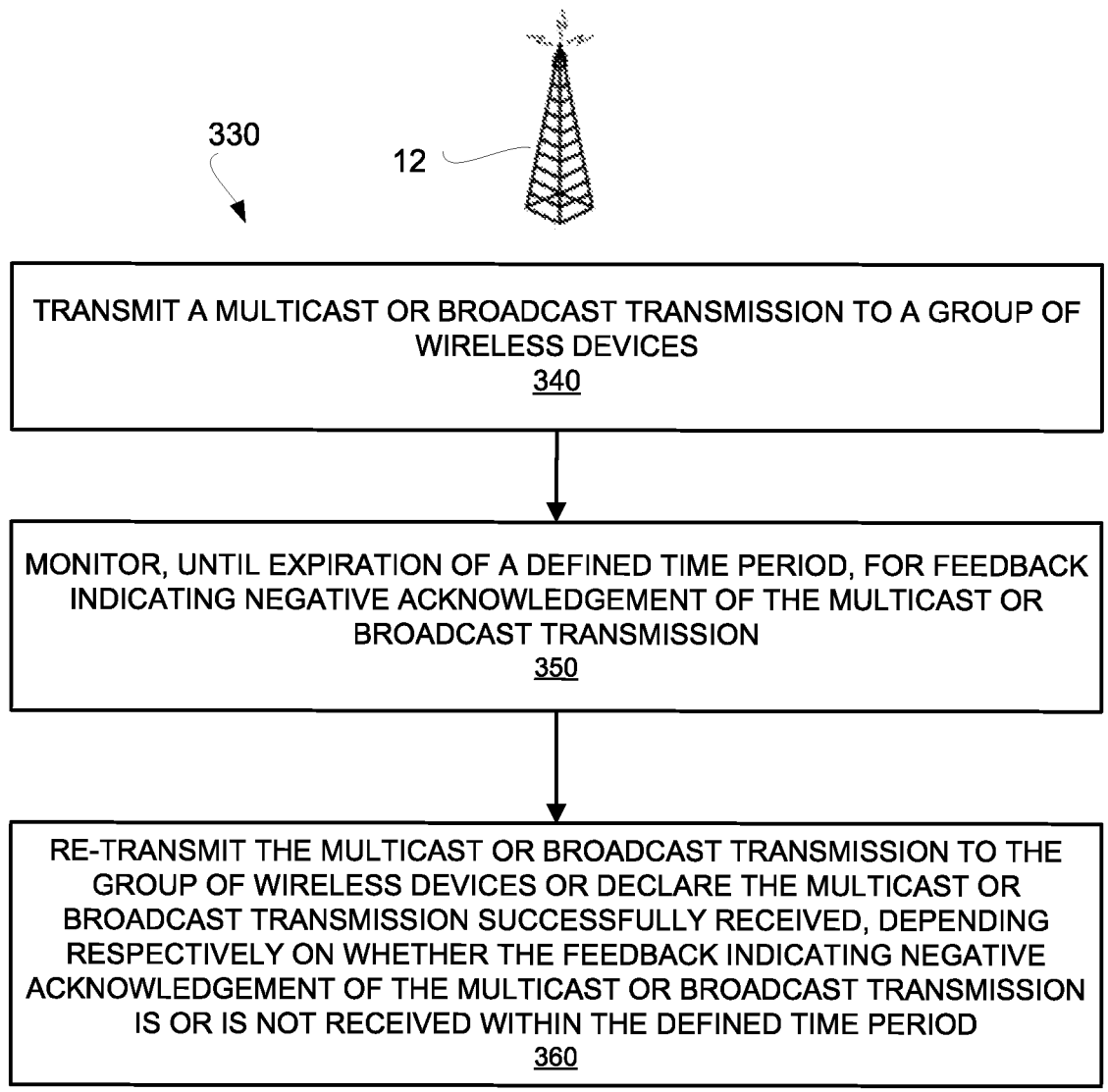
FIG. 8 is a logic flow diagram of a method performed by a radio network node according to yet other embodiments.

Further in view of the above modifications and variations, FIG. 8 illustrates a method 330 performed by a radio network node 12 for transmitting a multicast or broadcast transmission 14, according to some embodiments. As shown in FIG. 8, the method 330 comprises transmitting a multicast or broadcast transmission 14 to a group of wireless devices (Block 340). The method 330 also comprises monitoring, until expiration of a defined time period, for feedback indicating negative acknowledgement of the multicast or broadcast transmission 14 (Block 350). The method 330 further comprises re-transmitting the multicast or broadcast transmission 14 to the group of wireless devices or declaring the multicast or broadcast transmission 14 successfully received, depending respectively on whether the feedback indicating negative acknowledgement of the multicast or broadcast transmission 14 is or is not received within the defined time period (Block 360).

Figure 9:
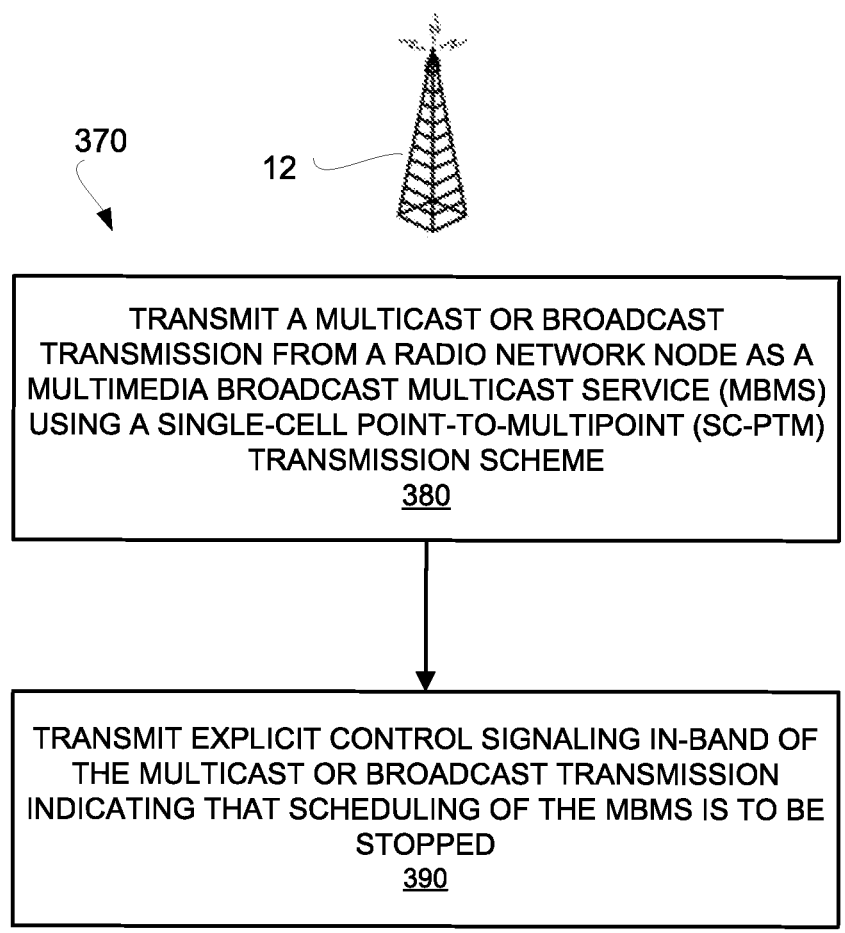
FIG. 9 is a logic flow diagram of a method performed by a radio network node according to still other embodiments.

Also in view of the above modifications and variations, FIG. 9 illustrates a method 370 performed by a radio network node 12 for transmitting a multicast or broadcast transmission 14, according to some embodiments. As shown, the method 370 comprises transmitting a multicast or broadcast transmission 14 from a radio network node 12 as a Multimedia Broadcast Multicast Service (MBMS) using a Single-Cell Point-to-Multipoint (SC-PtM) transmission scheme (Block 380). The method 370 also comprises transmitting explicit control signaling in-band of the multicast or broadcast transmission 14 indicating that scheduling of the MBMS is to be stopped (Block 390).

Embodiments herein further include a radio network node 12 configured to perform any of the processing herein, e.g., the method 300 in FIG. 7, the method 330 in FIG. 8, the method 370 in FIG. 9, and/or any other processing herein. Note that a radio network node 12 as described above may perform the method 300 in FIG. 7, the method 330 in FIG. 8, the method 370 in FIG. 9, and/or any other processing herein by implementing any functional means or units. In one embodiment, for example, the radio network node 12 comprises respective circuits or circuitry configured to perform the steps shown in FIG. 7, FIG. 8, and/or FIG. 9. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 10:
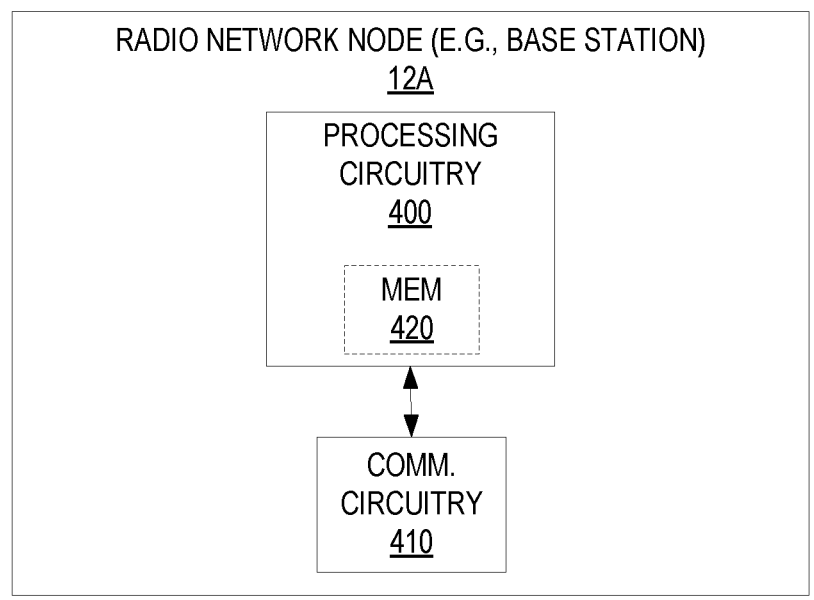
FIG. 10 is a block diagram of a radio network node according to some embodiments.

FIG. 10 illustrates the radio network node 12 in the form of a radio network node 12A in accordance with one or more embodiments. As shown, the radio network node 12A includes processing circuitry 400 and communication circuitry 410. The communication circuitry 410 is configured to transmit and/or receive information to and/or from one or more other nodes, e.g., via any communication technology. Such communication may occur via one or more antennas that are either internal or external to the radio network node 12A. The processing circuitry 400 is configured to perform processing described above, e.g., in FIG. 7, FIG. 8, and/or FIG. 9, such as by executing instructions stored in memory 420. The processing circuitry 400 in this regard may implement certain functional means, units, or modules.

Figure 11:
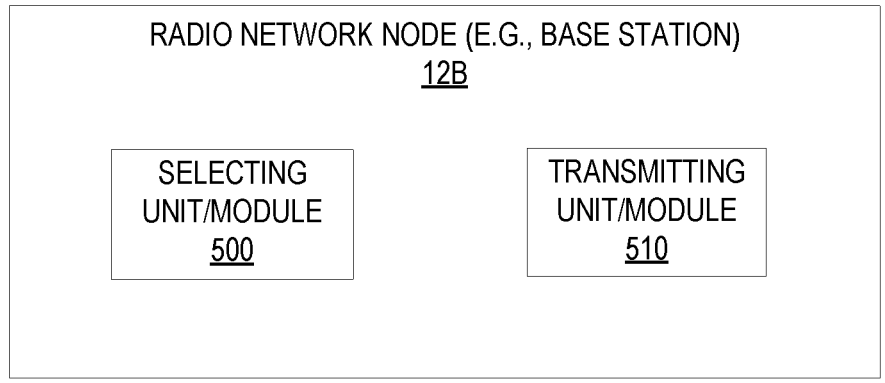
FIG. 11 is a block diagram of a radio network node according to other embodiments.

FIG. 11 illustrates the radio network node 12 in the form of a radio network node 12B implemented in accordance with one or more other embodiments. As shown, the radio network node 12B implements various functional means, units, or modules, e.g., via the processing circuitry 400 in FIG. 10 and/or via software code. These functional means, units, or modules, e.g., for implementing the method in FIG. 7, include for instance a selecting unit or module 500 for selecting a modulation and coding scheme (MCS) and a repetition factor with which to transmit the multicast or broadcast transmission 14, where the selected MCS and the selected repetition factor respectively target reception of the multicast or broadcast transmission 14 under different channel conditions. Also included is a transmitting unit or module 510 for transmitting the multicast or broadcast transmission 14 to the group 16 of wireless devices 18 with the selected MCS and repetition factor.

Figure 12:
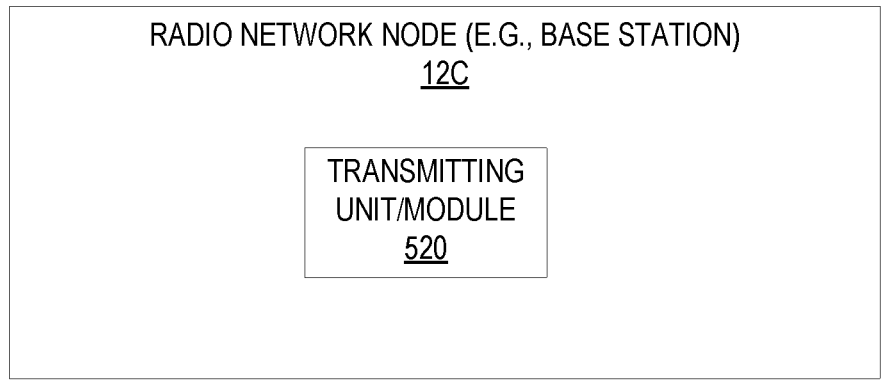
FIG. 12 is a block diagram of a radio network node according to yet other embodiments.

FIG. 12 illustrates the radio network node 12 in the form of a radio network node 12C implemented in accordance with one or more other embodiments. As shown, the radio network node 12C implements various functional means, units, or modules, e.g., via the processing circuitry 400 in FIG. 10 and/or via software code. These functional means, units, or modules, e.g., for implementing the method in FIG. 8, include for instance a transmitting unit or module 520 for transmitting a multicast or broadcast transmission 14 from a radio network node 12 as a Multimedia Broadcast Multicast Service (MBMS) using a Single-Cell Point-to-Multipoint (SC-PtM) transmission scheme, and for transmitting explicit control signaling in-band of the multicast or broadcast transmission 14 indicating that scheduling of the MBMS is to be stopped.

Figure 13:
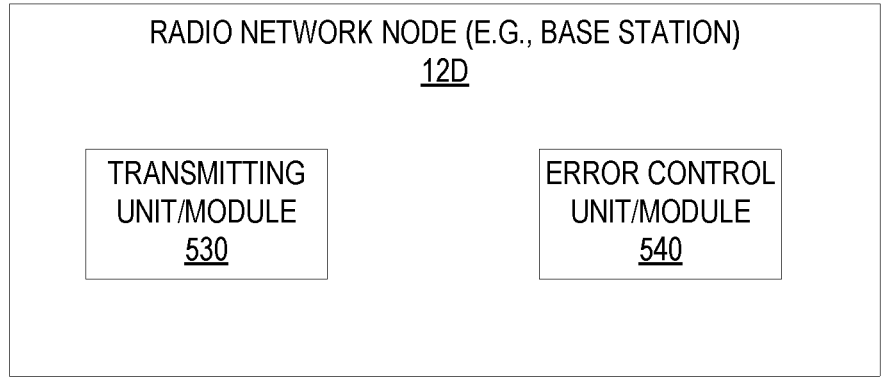
FIG. 13 is a block diagram of a radio network node according to still other embodiments.

FIG. 13 illustrates the radio network node 12 in the form of a radio network node 12D implemented in accordance with one or more other embodiments. As shown, the radio network node 12D implements various functional means, units, or modules, e.g., via the processing circuitry 400 in FIG. 10 and/or via software code. These functional means, units, or modules, e.g., for implementing the method in FIG. 9, include for instance a transmitting unit or module 530 for transmitting a multicast or broadcast transmission 14 to a group of wireless devices. Also included is an error control module 540 for monitoring, until expiration of a defined time period, for feedback indicating negative acknowledgement of the multicast or broadcast transmission, and for either re-transmitting the multicast or broadcast transmission to the group of wireless devices or declaring the multicast or broadcast transmission successfully received, depending respectively on whether the feedback indicating negative acknowledgement of the multicast or broadcast transmission is or is not received within the defined time period.

Further in view of the above modifications and variations, FIG. 14 illustrates a method 600 performed by a wireless device 18 for use in a wireless communication system 10, according to some embodiments. As shown, the method 600 comprises receiving, from a radio network node 12, a multicast or broadcast transmission 14 and downlink control information indicating a number of repetitions with which the multicast or broadcast transmission 14 is transmitted (Block 610). The method 600 also comprises operating according to a negative acknowledgement only feedback scheme in which the wireless device 18 is configured to transmit a negative acknowledgement to the radio network node 12 if decoding of the multicast or broadcast transmission 14 fails using the indicated number of repetitions and to refrain from transmitting a positive acknowledgement to the radio network node 12 if decoding of the multicast or broadcast transmission 14 succeeds (Block 620).

Also in view of the above modifications and variations, FIG. 15 illustrates a method 650 performed by a wireless device 18 for use in a wireless communication system 10, according to some embodiments. As shown, the method 650 comprises receiving, from a radio network node 12, a multicast or broadcast transmission 14 and downlink control information indicating are petition factor with which the multicast or broadcast transmission 14 is transmitted (Block 660). The method 650 also comprises, responsive to successfully decoding the multicast or broadcast transmission 14 using one or more repetitions with which the multicast or broadcast transmission 14 is transmitted, refraining from processing any additional repetitions with which the multicast or broadcast transmission 14 is transmitted and refraining from positively acknowledging the successful decoding to the radio network node 12 (Block 660). The method 600 further comprises, responsive to failing to decode the multicast or broadcast transmission 14 using a number of repetitions associated with the indicated repetition factor, transmitting feedback to the radio network node 12 negatively acknowledging reception of the multicast or broadcast transmission 14 (Block 670).

Figure 16:
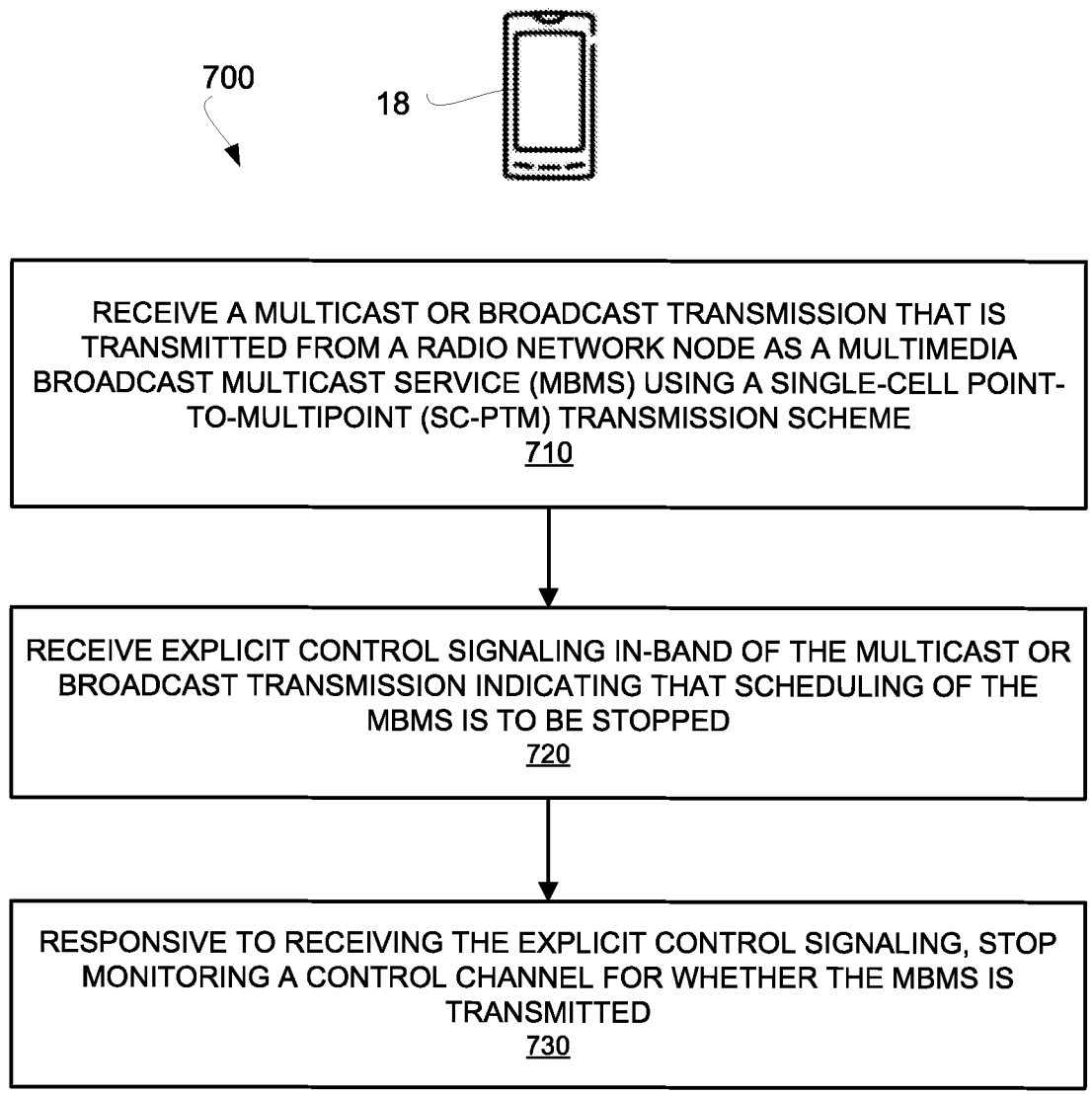
FIG. 16 is a logic flow diagram of a method performed by a wireless device according to still other embodiments.

Alternatively or additionally, FIG. 16 illustrates a method 700 performed by a wireless device 18 for use in a wireless communication system 10, according to some embodiments. As shown, the method 700 comprises receiving a multicast or broadcast transmission 14 that is transmitted from a radio network node 12 as a Multimedia Broadcast Multicast Service (MBMS) using a Single-Cell Point-to-Multipoint (SC-PtM) transmission scheme (Block 710). The method 700 also comprises receiving explicit control signaling in-band of the multicast or broadcast transmission 14 indicating that scheduling of the MBMS is to be stopped (Block 720). The method 700 further comprises, responsive to receiving the explicit control signaling, stopping monitoring a control channel for whether the MBMS is transmitted (Block 730).

Embodiments herein further include a wireless device 18 configured to perform any of the processing herein, e.g., the method 600 in FIG. 14, the method 650 in FIG. 15, the method 700 in FIG. 16, and/or any other processing herein. Note that a wireless device 18 as described above may perform the method 600 in FIG. 14, the method 650 in FIG. 15, the method 700 in FIG. 16, and any other processing herein by implementing any functional means or units. In one embodiment, for example, the wireless device 18 comprises respective circuits or circuitry configured to perform the steps shown in FIG. 14, FIG. 15 and/or FIG. 16. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 17:
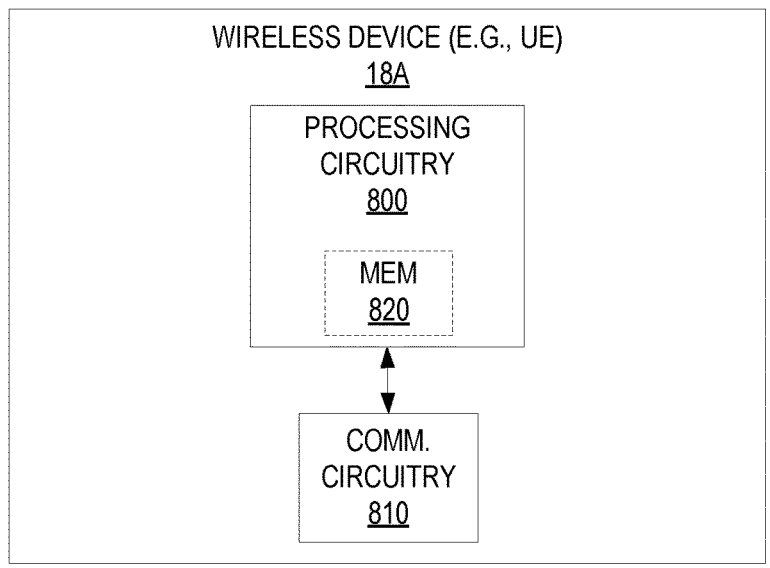
FIG. 17 is a block diagram of a wireless device according to some embodiments.

FIG. 17 illustrates the wireless device 18 in the form of a wireless device 18A in accordance with one or more embodiments. As shown, the wireless device 18A includes processing circuitry 800 and communication circuitry 810. The communication circuitry 810 is configured to transmit and/or receive information to and/or from one or more other nodes, e.g., via any communication technology. Such communication may occur via one or more antennas that are either internal or external to the wireless device 18A. The processing circuitry 800 is configured to perform processing described above, e.g., in FIGS. 14, 15 and/or 16, such as by executing instructions stored in memory 820. The processing circuitry 800 in this regard may implement certain functional means, units, or modules.

Figure 18:
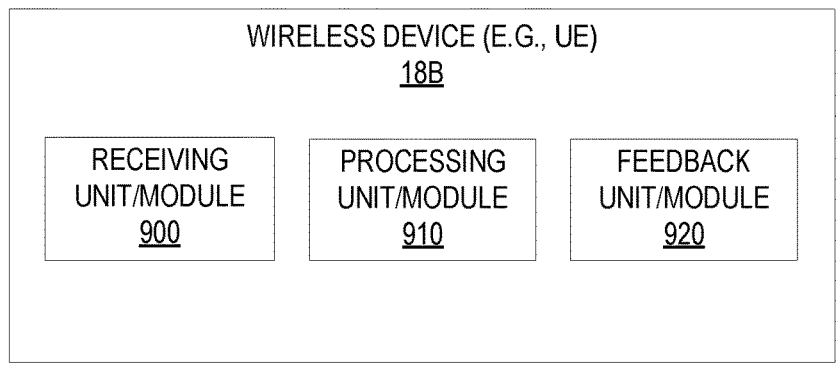
FIG. 18 is a block diagram of a wireless device according to other embodiments.

FIG. 18 illustrates the wireless device 18 in the form of a wireless device 18B implemented in accordance with one or more other embodiments. As shown, wireless device 18B implements various functional means, units, or modules, e.g., via the processing circuitry 800 in FIG. 17 and/or via software code. These functional means, units, or modules, e.g., for implementing the method in FIG. 15, include for instance a receiving unit or module 900 for receiving, from a radio network node 12, a multicast or broadcast transmission 14 and downlink control information indicating a repetition factor with which the multicast or broadcast transmission 14 is transmitted. Also included is a processing module 910 for, responsive to successfully decoding the multicast or broadcast transmission 14 using one or more repetitions with which the multicast or broadcast transmission 14 is transmitted, refraining from processing of any additional repetitions with which the multicast or broadcast transmission 14 is transmitted. Further included is a feedback module 920 for, responsive to successfully decoding the multicast or broadcast transmission 14 using one or more repetitions with which the multicast or broadcast transmission 14 is transmitted, refraining from positively acknowledging the successful decoding to the radio network node 12, and responsive to failing to decode the multicast or broadcast transmission 14 using a number of repetitions associated with the indicated repetition factor, transmitting feedback to the radio network node 12 negatively acknowledging reception of the multicast or broadcast transmission 14.

Figure 19:
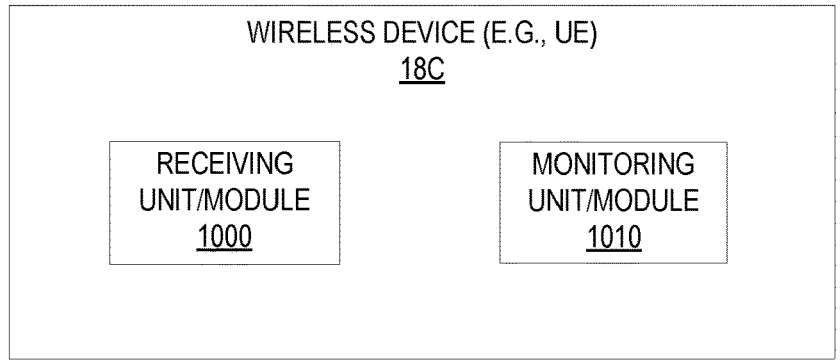
FIG. 19 is a block diagram of a wireless device according to yet other embodiments.

FIG. 19 illustrates the wireless device 18 in the form of a wireless device 18C implemented in accordance with one or more other embodiments. As shown, wireless device 18C implements various functional means, units, or modules, e.g., via the processing circuitry 800 in FIG. 17 and/or via software code. These functional means, units, or modules, e.g., for implementing the method in FIG. 16, include for instance a receiving module 1000 for receiving a multicast or broadcast transmission 14 that is transmitted from a radio network node 12 as a Multimedia Broadcast Multicast Service (MBMS) using a Single-Cell Point-to-Multipoint (SC-PtM) transmission scheme, and for receiving explicit control signaling in-band of the multicast or broadcast transmission 14 indicating that scheduling of the MBMS is to be stopped. Further included is a monitoring module 1010 for, responsive to receiving the explicit control signaling, stopping monitoring a control channel for whether the MBMS is transmitted.

Figure 20:
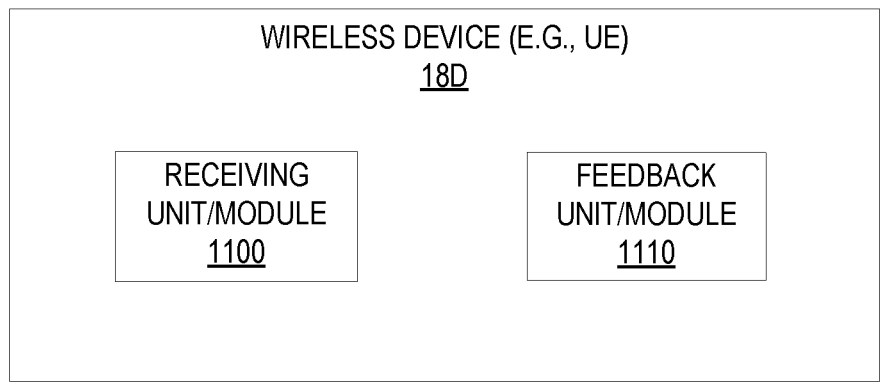
FIG. 20 is a block diagram of a wireless device according to still other embodiments.

FIG. 20 illustrates the wireless device 18 in the form of a wireless device 18D implemented in accordance with one or more other embodiments. As shown, wireless device 18D implements various functional means, units, or modules, e.g., via the processing circuitry 800 in FIG. 17 and/or via software code. These functional means, units, or modules, e.g., for implementing the method in FIG. 14, include for instance a receiving module 1100 for receiving, from a radio network node 12, a multicast or broadcast transmission 14 and downlink control information indicating a number of repetitions with which the multicast or broadcast transmission 14 is transmitted. Further included is a feedback module 1110 for operating according to a negative acknowledgement only feedback scheme in which the wireless device 18 is configured to transmit a negative acknowledgement to the radio network node 12 if decoding of the multicast or broadcast transmission 14 fails using the indicated number of repetitions and to refrain from transmitting a positive acknowledgement to the radio network node 12 if decoding of the multicast or broadcast transmission 14 succeeds.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

What is claimed is:

1. A method, performed by a wireless device configured for use in a wireless communication system, the method comprising the wireless device:
   receiving, from a radio network node, a multicast or broadcast transmission and downlink control information indicating a number of repetitions with which the multicast or broadcast transmission is transmitted;
   operating according to a negative acknowledgement only feedback scheme in which the wireless device is configured to transmit a negative acknowledgement to the radio network node if decoding of the multicast or broadcast transmission fails using the indicated number of repetitions and to refrain from transmitting a positive acknowledgement to the radio network node if decoding of the multicast or broadcast transmission succeeds;
   receiving explicit control signaling in-band of the multicast or broadcast transmission indicating that scheduling of the multicast or broadcast service is to be stopped; and
   responsive to receiving the explicit control signaling, stopping monitoring a control channel for whether the multicast or broadcast service is transmitted.

2. The method of claim 1, wherein, according to the negative acknowledgement only feedback scheme, the wireless device is configured to transmit a negative acknowledgement on a common uplink feedback channel that is common to wireless devices in a group to which the multicast or broadcast transmission is transmitted.

3. The method of claim 1, wherein, according to the negative acknowledgement only feedback scheme, the wireless device is configured to transmit a negative acknowledgement on uplink resources that are separately defined for wireless devices that have uplink synchronization and wireless devices that do not have uplink synchronization.

4. The method of claim 1, further comprising, after successfully decoding the multicast or broadcast transmission using one or more repetitions with which the multicast or broadcast transmission is transmitted, refraining from processing any additional repetitions with which the multicast or broadcast transmission is transmitted.

5. The method of claim 1, wherein the multicast or broadcast service whose scheduling is indicated as stopped by the explicit control signaling is a single cell point to multipoint (SC-PtM) service.

6. The method of claim 1, wherein the wireless device is a Machine-Type Communication (MTC) device or a Narrowband Internet of Things (NB-IoT) device.

7. A method, performed by a radio network node, for transmitting a multicast or broadcast transmission, the method comprising the network node:
   transmitting a multicast or broadcast transmission to a group of wireless devices;
   monitoring, until expiration of a defined time period, for feedback indicating negative acknowledgement of the multicast or broadcast transmission;
   re-transmitting the multicast or broadcast transmission to the group of wireless devices or declaring the multicast or broadcast transmission successfully received, depending respectively on whether the feedback indicating negative acknowledgement of the multicast or broadcast transmission is or is not received within the defined time period; and
   transmitting explicit control signaling in-band of the multicast or broadcast transmission indicating that scheduling of the multicast or broadcast service is to be stopped.

8. The method of claim 7, wherein the monitoring comprises monitoring received power on a common uplink feedback channel that is common to the wireless devices in the group.

9. The method of claim 7, wherein the monitoring comprises monitoring for feedback on uplink resources that are separately defined for wireless devices that have uplink synchronization and wireless devices that do not have uplink synchronization.

10. The method of claim 7, wherein the group of wireless devices is a portion of wireless devices served by the radio network node, and includes wireless devices that are substantially co-located.

11. The method of claim 7, wherein the multicast or broadcast service whose scheduling is indicated as stopped by the explicit control signaling is a single cell point to multipoint (SC-PtM) service.

12. The method of claim 7, wherein the wireless devices include Machine-Type Communication (MTC) devices and/or Narrowband Internet of Things (NB-IoT) devices.

13. A wireless device configured for use in a wireless communication system, the wireless device comprising:
  processing circuitry
  memory containing instructions executable by the processing circuitry whereby the wireless device is operative to:
    receive, from a radio network node, a multicast or broadcast transmission and downlink control information indicating a number of repetitions with which the multicast or broadcast transmission is transmitted;
    operate according to a negative acknowledgement only feedback scheme in which the wireless device is configured to transmit a negative acknowledgement to the radio network node if decoding of the multicast or broadcast transmission fails using the indicated number of repetitions and to refrain from transmitting a positive acknowledgement to the radio network node if decoding of the multicast or broadcast transmission succeeds;
    receive explicit control signaling in-band of the multicast or broadcast transmission indicating that scheduling of the multicast or broadcast service is to be stopped; and
    responsive to receiving the explicit control signaling, stop monitoring a control channel for whether the multicast or broadcast service is transmitted.

14. The wireless device of claim 13, wherein the instructions are such that the wireless device is operative to, according to the negative acknowledgement only feedback scheme, transmit a negative acknowledgement on a common uplink feedback channel that is common to wireless devices in a group to which the multicast or broadcast transmission is transmitted.

15. The wireless device of claim 13, wherein the instructions are such that the wireless device is operative to, according to the negative acknowledgement only feedback scheme, transmit a negative acknowledgement on uplink resources that are separately defined for wireless devices that have uplink synchronization and wireless devices that do not have uplink synchronization.

16. The wireless device of claim 13, wherein the instructions are such that the wireless device is operative to, after successfully decoding the multicast or broadcast transmission using one or more repetitions with which the multicast or broadcast transmission is transmitted, refrain from processing any additional repetitions with which the multicast or broadcast transmission is transmitted.

17. A radio network node configured to transmit a multicast or broadcast transmission to a group of wireless devices, the radio network node comprising:
  processing circuitry;
  memory containing instructions executable by the processing circuitry whereby the radio network node is operative to:
    transmit a multicast or broadcast transmission to a group of wireless devices;
    monitor, until expiration of a defined time period, for feedback indicating negative acknowledgement of the multicast or broadcast transmission;
    re-transmit the multicast or broadcast transmission to the group of wireless devices or declare the multicast or broadcast transmission successfully received, depending respectively on whether the feedback indicating negative acknowledgement of the multicast or broadcast transmission is or is not received within the defined time period; and
    transmit explicit control signaling in-band of the multicast or broadcast transmission indicating that scheduling of the multicast or broadcast service is to be stopped.

18. The radio network node of claim 17, wherein the instructions are such that the radio network node is operative to, monitor for the feedback indicating negative acknowledgement of the multicast or broadcast transmission by monitoring received power on a common uplink feedback channel that is common to the wireless devices in the group.

19. The radio network node of claim 17, wherein the instructions are such that the radio network node is operative to, monitor for the feedback indicating negative acknowledgement of the multicast or broadcast transmission by monitoring for feedback on uplink resources that are separately defined for wireless devices that have uplink synchronization and wireless devices that do not have uplink synchronization.

20. The radio network node of claim 17, wherein the group of wireless devices is a portion of wireless devices served by the radio network node, and includes wireless devices that are substantially co-located.

* * * * *